United States Patent [19]

Omura et al.

[11] 4,184,688
[45] Jan. 22, 1980

[54] TONE ARM ASSEMBLY

[75] Inventors: Yoshimoto Omura, Mitaka; Hideo Hara, Yokohama; Isao Kawashima, Chiba; Keisuke Sekiguchi, Yokohama; Kuninori Shino, Higashi-murayama, all of Japan

[73] Assignee: Sony Corporation, Tokyo, Japan

[21] Appl. No.: 923,455

[22] Filed: Jul. 10, 1978

[30] Foreign Application Priority Data

Jul. 11, 1977 [JP] Japan .................................. 52-83661

[51] Int. Cl.² ............................................. G11B 17/06
[52] U.S. Cl. .............................. 274/15 R; 274/9 RA; 274/23 R; 318/313
[58] Field of Search ........... 318/313; 274/23 R, 23 A, 274/9 RA, 1 L, 13 R, 14, 15 R

[56] References Cited

U.S. PATENT DOCUMENTS

| 2,952,464 | 9/1960 | Stimler ............................. 274/23 R |
| 3,572,724 | 3/1971 | Rabirow ............................ 274/23 A |
| 4,124,216 | 11/1978 | Sorensen .......................... 274/23 A |

FOREIGN PATENT DOCUMENTS

| 1954673 | 5/1971 | Fed. Rep. of Germany ........ 274/23 R |
| 2744223 | 4/1978 | Fed. Rep. of Germany ........ 274/23 R |
| 46-17249 | 5/1971 | Japan ........................................ 318/313 |

*Primary Examiner*—John W. Shepperd
*Attorney, Agent, or Firm*—Lewis H. Eslinger; Alvin Sinderbrand

[57] ABSTRACT

A tone arm assembly for record players has first and second electro-magnetic motors operable for swinging a tone arm in vertical and horizontal directions, respectively, in respect to a record disc on a turntable, and a control circuit for controlling the first and second motors in such a manner that the tone arm is moved from a raised inoperative position to a lowered playing position, or from the lowered playing position to the raised inoperative position in response to control signals.

18 Claims, 33 Drawing Figures

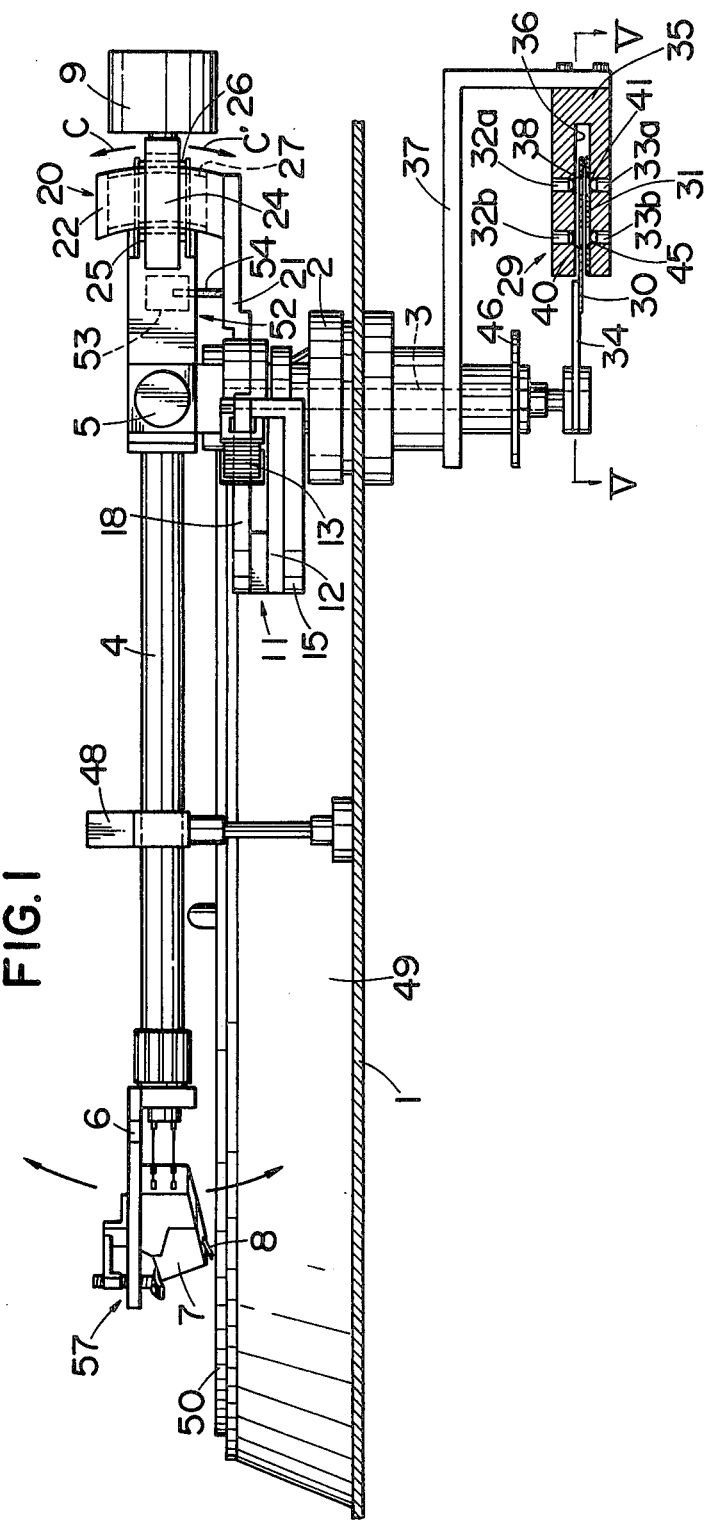

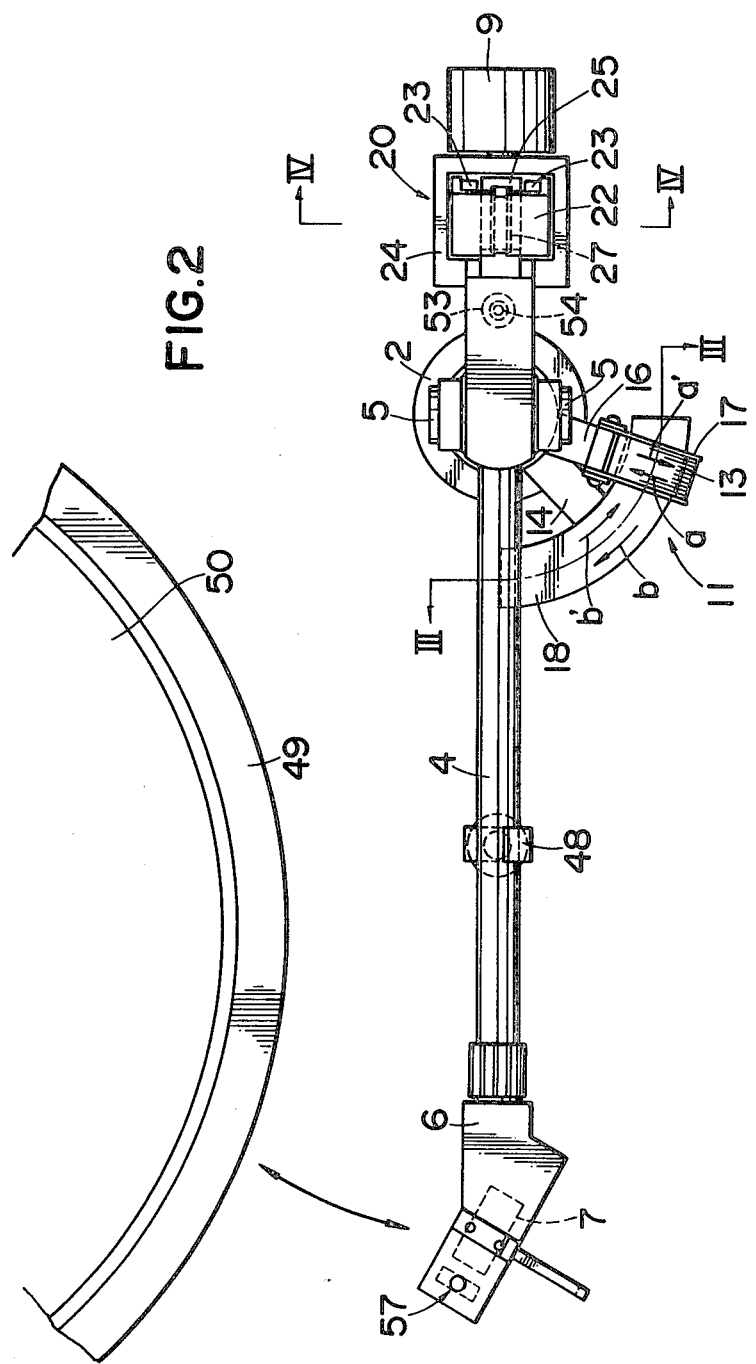

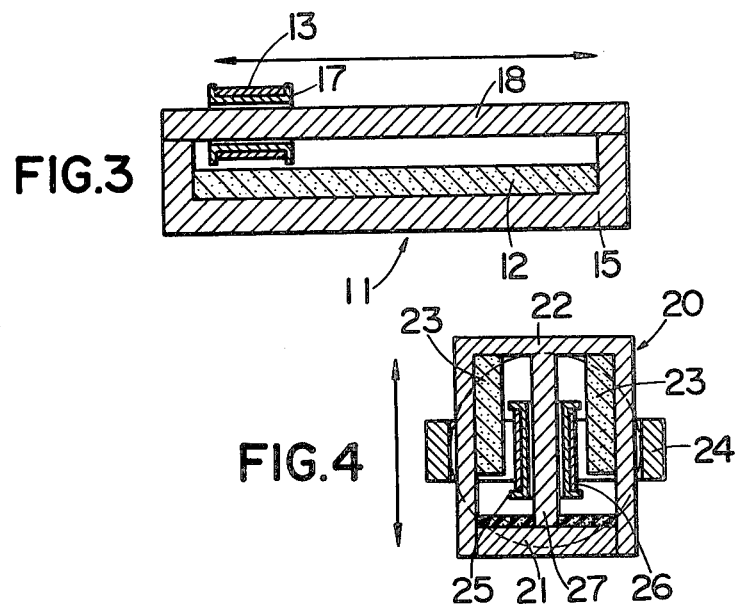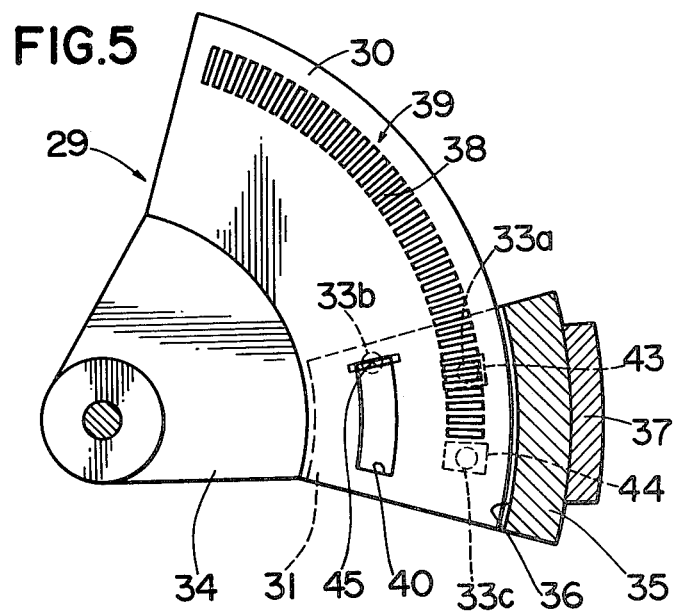

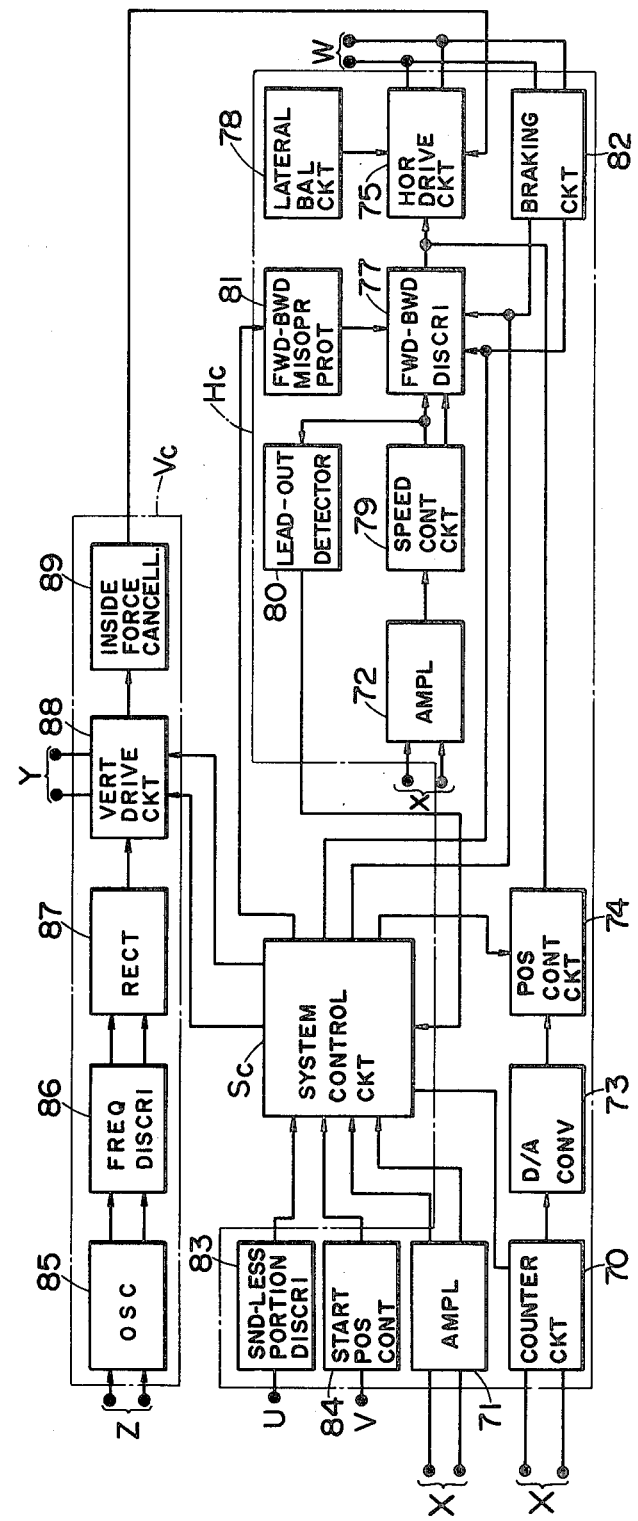

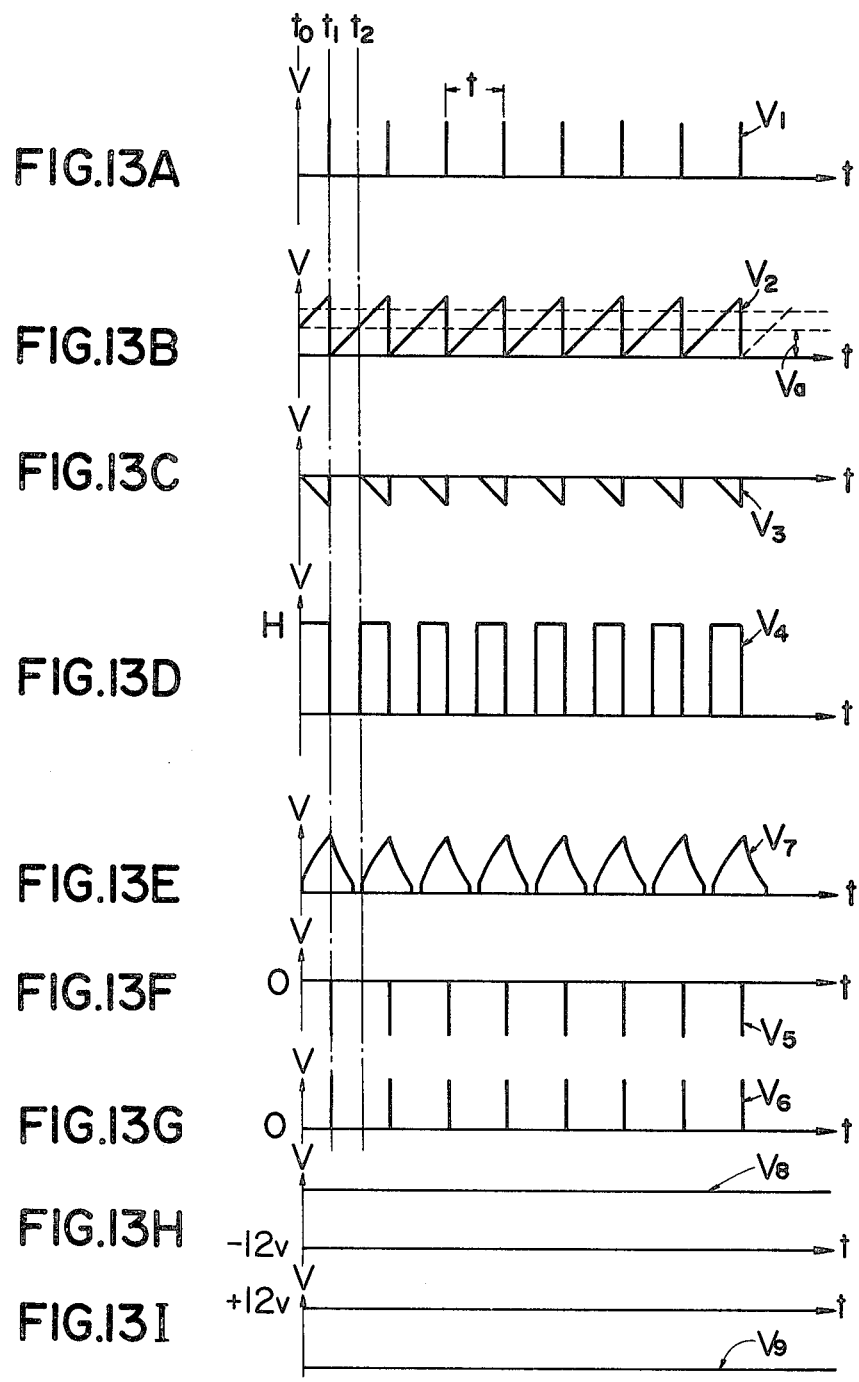

LEAD-OUT DIRECTION ← → LEAD-IN DIRECTION

TONE ARM ASSEMBLY

BACKGROUND OF THE INVENTION

1. Field of the Invention

This invention relates generally to a tone arm assembly, and is directed more particularly to a tone arm assembly which is controlled and positioned by electromagnetic forces.

2. Description of the Prior Art

It is the customary practice in record players to derive the power for moving the tone arm from the driving motor for the turntable by means of an intermediate cam disc driven by the shaft of the turntable. However, this is not an ideal solution, since the rotational speed of the turntable is inevitably affected by such arrangement which also adversely affects the sound reproducing system if manual controls are located on the resiliently supported chassis of the record player.

A record player to overcome the above-described defects of the conventional record player is disclosed in the U.S. Pat. No. 3,993,315 in which separate driving means are provided for moving the tone arm both horizontally and vertically and are controlled by switch means actuated in response to selection and/or detection of the appropriate conditions for respective movements of the tone arm. In such record player, the tone arm movements may be controlled entirely independent of the turntable, for example, for raising the tone arm in response to completion of the playing of a record. However, in the record player disclosed in U.S. Pat. No. 3,993,315, the tone arm is moved in the horizontal direction by means of a mechanical gear arrangement. A feed pitch of the gear arrangement may not coincide with the groove pitch of the record disc. Accordingly, the horizontal movement of the tone arm is not always smooth and satisfactory.

Another record player is known, for example, as disclosed in U.S. Pat. Nos. 4,023,130 and 3,830,505, in which the tone arm is driven in the vertical direction in respect to the record disc by means of electro-magnetic force. However, there is no suggestion to drive the tone arm in the horizontal direction with respect to the record disc by the use of electromagnetic force.

In some conventional record players, the tone arm is mechanically braked so as to stabilize movements in the lead-in direction and the lead-out direction. However, these record players are disadvantageous in that they are complex in construction, expensive and susceptible to trouble.

Further, in some existing record players, the direction of movement of the tone arm is automatically charged-over from the lead-in direction to the lead-out direction in response to a mechanical detection or microswitch detection, and, upon actuation of a start switch, the tone arm is automatically led-in from a rest position on an arm rest to a set-down position on the record disc. However, these record players are complex in construction and the required parts are expensive. Further, if the start switch is actuated at a time when the tone arm is not correctly positioned on the arm rest, the tone arm is driven in the lead-in direction only after a substantial delay leading the operator to wonder if the record player might be out of order.

A tone arm assembly provided with horizontal and vertical drive means for the tone arm is disclosed in the copending U.S. Pat. application Ser. No. 790,047, filed Apr. 22, 1977, and having a common assignee herewith.

OBJECTS AND SUMMARY OF THE INVENTION

Therefore, it is an object of the present invention to provide a tone arm assembly which not only overcomes the above problems of the prior art but also improves on the control arrangement disclosed in the prior application Ser. No. 790,047.

Another object of this invention is to provide a tone arm assembly in which a tone arm is electrically braked during the lead-in and lead-out operations, and which is simple in construction, low in cost and not prone to trouble.

A further object of this invention is to provide a tone arm assembly in which a tone arm is driven at once upon actuation of a start switch, even in the case that such actuation occurs at a time when the tone arm is not correctly positioned on the arm rest, and further in which misoperation can be prevented.

A still further object of this invention is to provide a tone arm assembly in which the lead-out operation of the tone arm can be electrically and securely controlled in simple manner.

A still further object of this invention is to provide a tone arm assembly in which the tone arm can be accurately moved even in the case that an external force is unexpectedly applied to the tone arm during the lead-in or lead-out operation.

In accordance with an aspect of this invention, a tone arm assembly includes a tone arm having a stylus depending therefrom at one end thereof, a first motor mechanically coupled to the tone arm for moving the tone arm in the vertical direction with respect to a record disc on a turntable, a second motor mechanically coupled to the tone arm for moving the tone arm in the horizontal direction with respect to the record disc, a first motor drive circuit for energizing the first motor in such a manner that the tone arm is moved between an inoperative raised position and a reproducing or set-down position on the record disc, a second motor drive circuit for energizing the second motor in such a manner that the tone arm is moved between an inoperative rest position and a raised position above the reproducing position on the record disc, or vice versa, and circuit means for supplying a current to the second motor so as to brake the latter while the second motor is energized by the second motor drive circuit.

The above, and other objects, advantages and features of the present invention, will become readily apparent from the following detailed description of illustrative embodiments which is to be read in connection with the accompanying claims.

BRIEF DESCRIPTION OF THE DRAWINGS

FIG. 1 is an elevational view, which is partly broken away and in section, of a tone arm assembly according to one embodiment of this invention;

FIG. 2 is a plan view of the tone arm assembly of FIG. 1;

FIG. 3 is an enlarged cross-sectional view taken along the line III—III of FIG. 2;

FIG. 4 is an enlarged cross-sectional view taken along the line IV—IV of FIG. 2;

FIG. 5 is an enlarged cross-sectional view taken along the line V—V of FIG. 1;

FIG. 11B is a block diagram of a vertical control system and a horizontal control system for the tone arm assembly of FIG. 11A;

FIGS. 13A to 13I are waveforms to which reference will be made in explaining the operation of the horizontal control system;

DESCRIPTION OF THE PREFERRED EMBODIMENTS

Figure 11A:
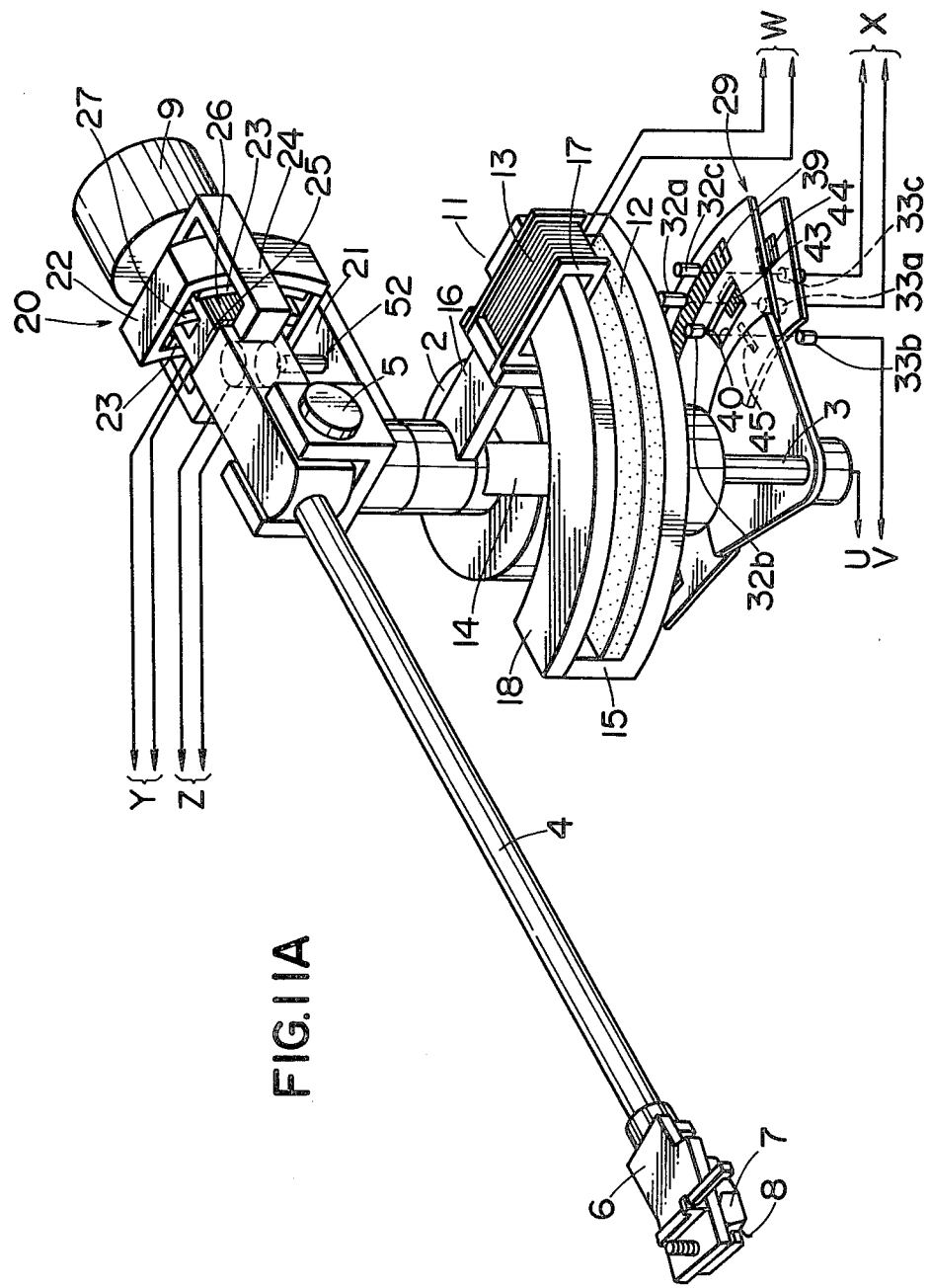
FIG. 11A is a perspective view of the tone arm assembly of FIG. 1.

A tone arm assembly for a record player according to one embodiment of this invention will now be described with initial reference to FIGS. 1, 2 and 11A of the drawings. Such tone arm assembly is shown to include a vertical arm shaft 3 supported so as to be rotatable round its vertical axis in a bearing block 2 fixed on an upper panel 1. A tone arm 4 is mounted by a pivot mechanism 5 on the upper end of the arm shaft 3 so that a head shell 6 at the free end of arm 4 can be moved in the vertical and horizontal directions as indicated by the arrows on FIG. 1 and FIG. 2. In the horizontal movement, the tone arm 4 is rotated together with the vertical arm shaft 3 round the vertical axis of the latter. A reproducing stylus 8 depends from a cartridge 7 mounted in head shell 6, and a weight 9 is mounted at the tail end of the tone arm 4.

A horizontal drive motor 11 is disposed at one side of tone arm 4 and includes an arcuate permanent magnet 12 which is curved concentrically with the arm shaft 3, and a coil 13 which is rotated together with the arm shaft 3 round the vertical axis of the latter so as to move parallel with the surface of the permanent magnet 12. The permanent magnet 12 is suitably fixed to a mount 15, as by adhesive, and mount 15 is fixed through an arm 14 to bearing block 2. The coil 13 is wound on a bobbin 17 which is fixed by a radial arm 16 to arm shaft 3. The mount 15 is arcuate similarly to the permanent magnet 12, and has a U-shaped cross section. A horizontal plate 18 which is also arcuate is fixed on the vertically projecting ends of the mount 15 (FIG. 3). The bobbin 17 is designed to receive and to be movable along the horizontal plate 18.

The permanent magnet 12 is magnetized in the direction of its thickness, that is, the magnetic flux from permanent magnet 12 flows substantially in the vertical direction. The horizontal plate 18 and mount 15 constitute a closed magnetic path. The direction of current flowing through coil 13 is normal to the direction of the magnetic flux generated by permanent magnet 12. In other words, a current flows through coil 13 in the direction of the arrow a or a′ on FIG. 2, and intersects the magnetic flux at right angles to the latter. On the basis of Fleming's rule, a drive force in the direction of the arrow b or b′ on FIG. 2 is imparted to coil 13 in response to the current in the direction a or a′ to drive the tone arm 4 in the lead-in direction or the lead-out direction. The drive force increases with the intensity of the current flowing through the coil 13. However, the drive force is constant for a given intensity of the current.

The illustrated tone arm assembly is further shown to have a vertical drive motor 20 which, in principle, is similar to the horizontal drive motor 11. More particularly, vertical drive motor 20 is shown to include a pair of parallel permanent magnets 23 fixed, as by adhesive, to inside surfaces of a rectangular mount 22. The mount 22 is fixed through a radial arm 21 to a part of arm shaft 3. The permanent magnets 23 are curved concentrically with the horizontal axis of pivot mechanism 5, and are disposed in vertical planes. A square mounting frame 24 is arranged around mount 22, and it is fixed to tone arm 4 so as to extend horizontally in a plane parallel to the longitudinal axis of arm 4. A vertical plate 27 (FIG. 4) is fixed to mount 22 at the center of the latter. A coil 26 is wound on bobbin 25 disposed between permanent magnets 23, and is so designed as to be movable along vertical plate 27. The permanent magnets 23 are magnetized in the directions of their thickness so that magnetic flux flows in the horizontal direction between the magnets 23. The vertical plate 27 and the mount 22 constitute a closed magnetic path. The direction of the current flowing through coil 26 is normal to the direction of the magnetic flux. A drive force in the direction shown by the arrow c or c′ on FIG. 1 is imparted to tone arm 4 as a result of the interaction of the current in coil 26 with the magnetic flux, so as to drive tone arm 4 in the vertical direction. The weight 9 may be fixed through mounting frame 24 to the tail end of tone arm 4.

The tone arm assembly also has a horizontal position detector 29 which will be described with reference to FIGS. 1, 5–8 and 11A. More particularly, horizontal position detector 29 is shown to include a movable slit plate 30, a stationary slit plate 31, three light emitting elements 32a, 32b and 32c such as lamps, and three light-sensitive elements 33a, 33b and 33c such as photo diodes. The movable slit plate 30 is substantially sectorial, and is horizontally fixed through a mounting plate 34 to the lower end of arm shaft 3. The stationary slit plate 31 is about one third as large as the movable slit plate 30 in the circumferential direction, and it is arranged under movable slit plate 30 in slightly spaced, parallel relation to the latter. As clearly shown on FIG. 1, light-emitting elements 32a, 32b and 32c, and light-sensitive elements 33a, 33b and 33c are held in a holder 35 which is U-shaped in cross section to define a horizontal slit 36 in which movable slit plate 30 is inserted. The stationary slit plate 31 is fixed to the lower wall surface of horizontal slit 36 in holder 35, as by adhesive. The holder 35 is fixed by a mounting arm 37 to the lower end of the bearing block 2.

Numerous slits 38 are arranged in an arcuate row in the peripheral portion of movable slit plate 30 as to be concentric with arm shaft 3. Further, radially inward in respect to the row of slits 38, is an arcuate hole 40 in the movable slit plate 30 which is also concentric with arm shaft 3. Two rows of slits 41 and 42 (FIG. 7) are formed in the peripheral portion of stationary slit plate 31 so as to be concentric with arm shaft 3, and to register radially with the row of slits 38 in movable slit plate 30. The slits 38 of movable slit plate 30 and the slits 41 and 42 are equal to each other in width and slit-pitch. A further slit 45 is made in stationary slit plate 31 so as to register radially with the arcuate hole 40 of movable slit plate 30. If the slit pitch is $\lambda$, the spacing between the rows of the slits 41 and 42 is made to be nearly equal to $n\lambda \pm \frac{1}{4}\lambda$. In other words, the slits 41 are shifted in phase in respect to the slits 42. The light emitting elements 32a and 32c are arranged above the slits 43 and 44, respectively. The light-sensitive elements 33a and 33c are arranged under the slits 43 and 44, respectively. The light-emitting element 32b is arranged above the slit 45, and the light-sensitive element 33b is arranged under the slit 45. The light-emitting elements 32a, 32b and 32c and the light-sensitive elements 33a, 33b and 33c are electrically connected to a print circuit board 46 fixed to the lower end of bearing block 2 (FIG. 1).

In the horizontal position detector 29, when tone arm 4 is moved in the horizontal direction, movable slit plate 30 turns with arm shaft 3 in the horizontal direction. The position of movable slit plate 30 relative to stationary slit plate 31 is detected for determining the horizontal position of tone arm 4. Further, the horizontal position detector 29 is designed to aid in controlling the speed of horizontal movement of the tone arm 4.

As shown on FIG. 5, when arcuate hole 40 of movable slit plate 30 is superposed on slit 45 of stationary slit plate 31, light from light-emitting element 32b is received by light-sensitive element 33b to control the position of the tone arm 4. More particularly, tone arm 4 is stopped at an arm rest 48 which is fixed on the upper panel 1 (FIGS. 1 and 2) when hole 40 is superposed on slit 45. When the tone arm 4 is moved in the horizontal direction from arm rest 48 toward a record disc 50 mounted on a turntable 49, the row of slits 39 in movable slit plate 30 moves relative to slits 43 and 44 of stationary slit plate 31. Accordingly, light from light-emitting elements 32a and 32c is intermittently received by the light-sensitive elements 33a and 33c, respectively, and, as a result thereof, alternating signals are obtained from light-sensitive elements 33a and 33c to control the speed of the horizontal movement of tone arm 4. As a result of a phase difference of $n\lambda \pm \frac{1}{4}\lambda$ between the alternating signals obtained from the light-sensitive elements 33a and 33c, the direction of the horizontal movement of the tone arm 4 can be detected. In other words, movements in the lead-in direction and lead-out direction of the tone arm 4 can be detected by the phase difference.

Figure 6:
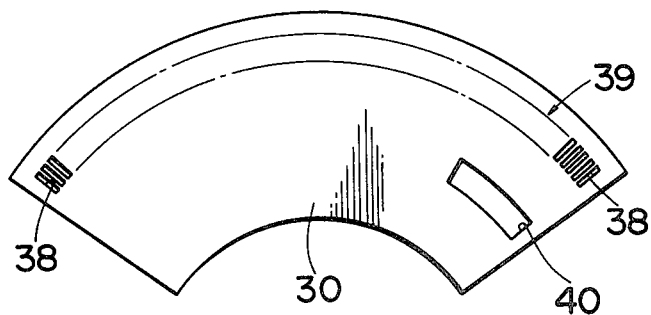
FIG. 6 is an enlarged plan view of a movable slit plate in a horizontal position detector of the tone arm assembly shown in FIG. 1.
Figure 7:
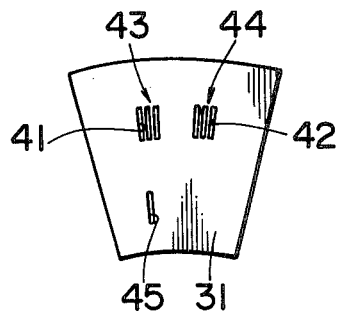
FIG. 7 is an enlarged plan view of a stationary slit plate in the horizontal position detector.
Figure 8:
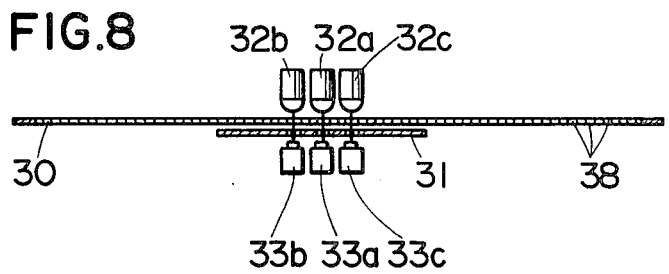
FIG. 8 is an enlarged developmental view illustrating the relationship between the slit plates, light-emitting elements and light-sensitive elements of the horizontal position detector.
Figure 9:
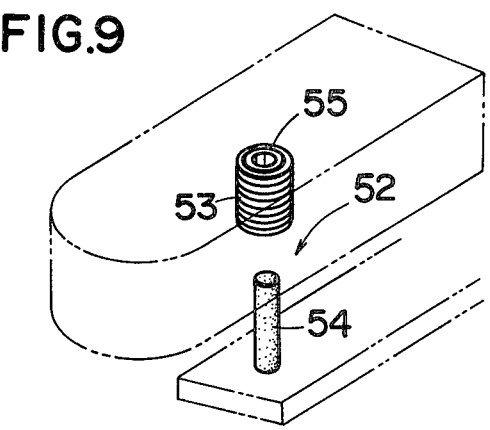
FIG. 9 is an enlarged perspective view of a vertical position detector included in the tone arm assembly shown in FIG. 1.

The tone arm assembly further includes a vertical position detector 52 of the tone arm 4 which will be described with reference to FIGS. 1, 2 and 9.

More particularly, vertical position detector 52 is shown to include a coil 53 and a pressed powder core 54 which is insertable into coil 53. The coil 53 is held in an insulating cylinder 55 which is vertically fixed in one end portion of tone arm 4. The core 54 is fixed on radial arm 21 so as to extend vertically upward from the latter.

In the vertical position detector 52, when tone arm 4 is moved in the vertical direction, the relative position (or inserted depth) of core 54 in coil 53 varies to change the inductance of the coil 53. Thus, the vertical position of the tone arm 4 can be detected by the inductance of coil 53.

Figure 10:
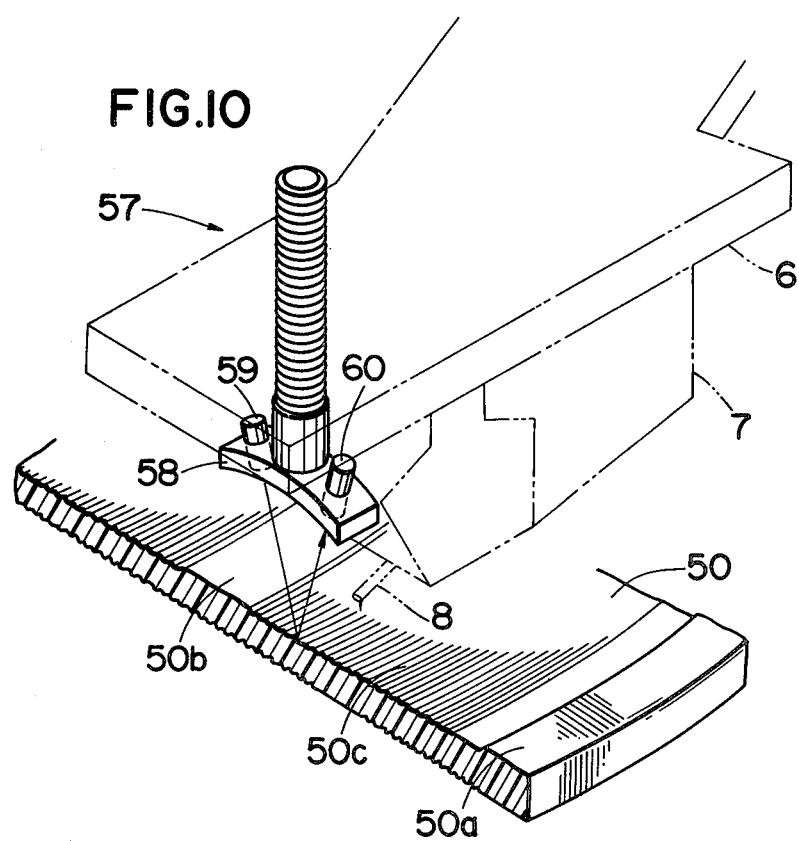
FIG. 10 is an enlarged perspective view of a soundless portion sensor included in the tone arm assembly shown in FIG. 1.

A sound-less portion sensor 57 is also included in the tone arm assembly and will be described with reference to FIGS. 1, 2 and 10.

The sound-less portion sensor 57 is arranged on the top portion of head shell 6 adjacent to the stylus, and includes a light emitting element 59, such as a lamp, and a light-sensitive element 60, such as a CdS photocell or the like, which are held in an inverted T-shaped holder 58 fixed to head shell 6. When tone arm 4 has been moved to a position over the record disc 50 in the course of a lead-in operation, the light from light-emitting element 59 is reflected by recorded disc 50, and the reflected light is received by light-sensitive element 60, as shown on FIG. 10.

The difference between the intensities of the light reflected from a peripheral sound-less portion 50a or other sound-less portion 50b of the record disc 50 and the light reflected from a sound groove portion 50c thereof can be read out by the sound-less portion sensor 57. The intensity of the light reflected from the peripheral sound-less portion 50a or other sound-less portion 50b is higher than that of the light reflected from the sound groove portion 50c. It will be apparent that the position of tone arm 4 in the horizontal direction can be controlled with reference to the signal of the sound-less portion sensor 57 and the corresponding detecting signal of the horizontal position detector 29. The reflection point or record 50 of light from light emitting element 59 is preferably made close to the point of contact of the reproducing stylus 8 of the cartridge 7 with the record or is forward therefrom, considered in the lead-in direction.

The speed of horizontal movement of tone arm 4 is rapidly increased at the time when tone arm 4 has reached the end portion of the sound groove and engages the usual run-out groove. Therefore, the frequency of the alternating signal from horizontal position detector 29 is increased at such time. Thus, the lead-out position of the tone arm 4 is also detected from the output of the horizontal position detector 29.

The tone arm assembly according to the invention further generally comprises a vertical control system Vc which controls zero-balance, stylus pressure, low-frequency resonance and upward and downward movements of tone arm 4; and a horizontal control system Hc which controls lead-in and lead-out operations of tone arm 4, the speed of the horizontal movement of tone arm 4 in the lead-in and lead-out operations, and the stop position of tone arm 4.

The horizontal control system Hc for tone arm 4 will now be described with reference to FIG. 11B.

First, it will be seen that the output signals x of the light-sensitive elements 33a and 33c (FIG. 11A) are supplied to a counter circuit 70 and amplifiers 71 and 72. The counter circuit 70 counts the output signals of light-sensitive elements 33a and 33c only when commanded to do so by a control signal supplied from a system control circuit Sc.

The system control circuit Sc is a mini-computer or so-called "micro-processor", and supplies control signals to respective circuits of the horizontal control circuit Hc and vertical control circuit Vc in accordance with a predetermined program.

Pulse signals from counter circuit 70 are supplied to a D/A converter 73, and converted to an analogue signal thereby. The analogue signal from D/A converter 73 is supplied to a position control circuit 74. The position control circuit 74 works to stop tone arm 4 at predetermined positions, and is controlled by a respective control signal from system control circuit Sc and by the output of D/A converter 73. When the record player is in its play condition, or in other words, when tone arm 4 is positioned on record disc 50, position control circuit 74 is designed to generate an output signal which is nearly at the "0" voltage or level. The output of position control circuit 74 is supplied to a horizontal drive circuit 75. The horizontal drive circuit 75 is controlled by the output of position control circuit 74 and by output signals from the forward-backward discriminator 77 and a lateral-balance circuit 78 to be described hereinafter, for driving the horizontal drive motor 11 in either the lead-in direction or the lead-out direction.

The output signals x of light-sensitive elements 33a and 33c are amplified by amplifier 72 to predetermined levels and then supplied to a speed control circuit 79 which works to control the speed of the horizontal drive motor 11 in sampling-hold operation. Two output signals which are opposite to each other in phase are obtained from the speed control circuit 79, and are supplied to forward-backward discriminator 77. One of the two output signals from speed control circuit 79 is also supplied to a lead-out detecting circuit 80.

The forward-backward discriminator 77 is operative to determine the direction of the horizontal movement of horizontal drive motor 11 in response to a control signal supplied from the system control circuit Sc. The polarity of the output signal of forward-backward discriminator 77 is changed in accordance with the control signal supplied from the system control circuit Sc.

The lead-out detecting circuit 80 detects the end of a play operation by means of the change of the voltage level of the output signal from speed control detecting circuit 79. The lead-out detecting signal from lead-out detecting circuit 80 is supplied to system control circuit Sc.

When an external force is applied, for example, by hand, tone arm 4 and causes the tone arm 4 to be erroneously moved in the lead-out direction during a lead-in operation, a forward-backward misoperation-protecting circuit 81 is operative to detect the erroneous movement of the tone arm in the lead-out direction. As soon as the tone arm 4 is erroneously moved in the lead-out direction, an output signal is supplied to horizontal drive circuit 75 from forward-backward misoperation-protecting circuit 81 through the forward-backward discriminator 77 to again move the tone arm 4 in the lead-in direction. Accordingly, when tone arm 4 is erroneously moved in the lead-out direction during a lead-in operation, a current to dirve the horizontal drive motor 11 in the lead-in direction is rapidly intensified to increase the rotational torque of the horizontal drive motor 11. Thus, the tone arm 4 is again moved in the lead-in direction.

The lateral-balance circuit 78 is operative to maintain the lateral balance of reproducing stylus 8. The bias voltage of the horizontal drive circuit 75 is adjusted by the lateral-balance circuit 78 to control the current flow to the horizontal drive motor 11.

A brake circuit 82 is operative to electrically brake tone arm 4 during the lead-in or lead-out operation. The frictional resistance between arm shaft 3 of tone arm 4 and bearing block 2 is extremely low. Accordingly, when horizontal drive motor 11 is energized, there is the danger that tone arm 4 may be moved excessively in the horizontal direction by the initial drive force. The brake circuit 82 avoids that danger. A current opposite to the current supplied by the horizontal drive circuit 75 is supplied to the horizontal drive motor 11 by brake circuit 82 so that tone arm 4 is electrically braked so as not to be excessively moved in the horizontal direction.

The output signal U of light-sensitive element 60 of the sound-less portion sensor 57 is supplied to a sound-less portion discriminator 83 which detects therefrom whether tone arm 4 is positioned above the peripheral sound-less portion 50a or an intermediate sound-less portion 50b of the record disc 50, or above the sound groove portion 50c thereof. The discriminating output signal from sound-less portion discriminator 83 is supplied to system control circuit Sc.

The output signal V of light-sensitive element 33b is supplied to a start-position control circuit 84 which determines therefrom whether tone arm 4 is positioned on arm rest 48, or not. The output signal of start-position control circuit 84 is supplied to the system control circuit Sc.

Next, the vertical control system Vc for controlling the vertical movement of tone arm 4 will be described with reference to FIGS. 11A and 11B.

An oscillating frequency of an oscillator 85 is controlled by a signal Z which varies with the inductance of the coil 53 of vertical position detector 52. The output of oscillator 85 is supplied to a frequency discriminator 86. The output of the frequency discriminator 86 is supplied to a rectifier 87 so that the voltage level of the output of rectifier 87 varies with the output frequency of oscillator 85. A vertical drive circuit 88 is operative to provide a drive signal or current Y to drive the vertical drive motor 20. The intensity of the current flow Y into the vertical drive motor 20 varies with the voltage level of the output of rectifier 87. The output of the vertical drive circuit 88 is also supplied to an inside-force (skating-force) cancelling circuit 89.

As is well known, an inside or inwardly directed force is applied to the tone arm 4 due to the frictional force between stylus 8 and the sound groove of record disc 50 during the playing of the latter. The inside-force cancelling circuit 89 supplies to horizontal drive motor 11 a current proportional to the current flowing through vertical drive motor 20 so as to cancel the inside- or inwardly-directed, skating force.

Details of the circuits included in horizontal control system Hc and vertical control system Vc and the operations thereof will now be described with reference to FIGS. 12A and 12B in which a +V-power source of +12 volts and a −V power source of −12 volts are provided with reference to an earth line or reference potential E.

Considering the lead-in operation of tone arm 4, it will be apparent that two conditions are possible. In one of these conditions, tone arm 4 is correctly positioned on arm rest 48 and, in the other condition, tone arm 4 is not correctly positioned on arm rest 48. The former case will be here assumed in describing the lead-in operation.

Figure 12A:
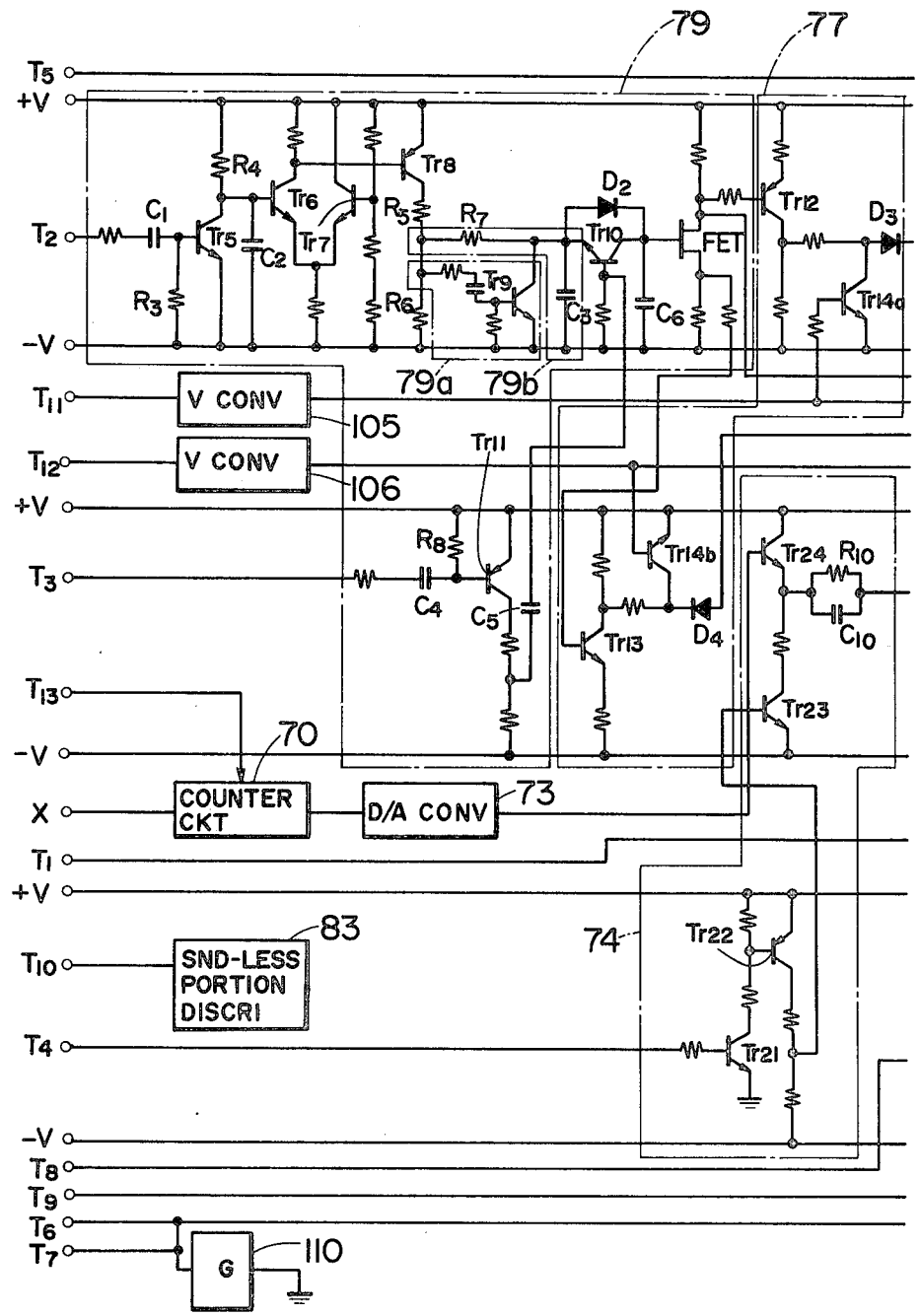
FIGS. 12A and 12B, taken together, show a circuit diagram of the horizontal control system.

First, a start-switch (not shown) is turned-on or actuated to supply the source voltages +V and −V to the respective circuits (FIG. 12A). Since tone arm 4 is correctly positioned on arm rest 48, slit 45 is aligned with oblong hole 40 (FIGS. 1 and 5) in the stop or rest position of tone arm 4. Accordingly, the light from light-emitting element 32b is received by light-sensitive element 33b to supply a relatively high voltage to the start-position control circuit 84 (FIG. 12B).

In start-position control circuit 84, resistors $R_1$ and $R_2$ are connected in series with each other between the +V power line and −V power line. The light-sensitive element 33b in the form of a photo-diode is connected between the connecting point of resistors $R_1$ and $R_2$, and a base electrode of a transistor $Tr_1$. When the light from light-emitting element 32b is received by photo-diode 33b, a base current is supplied to the base of transistor $Tr_1$ to turn ON the latter. Accordingly, the collector voltage of transistor $Tr_1$ is decreased or lowered. The base-emitter voltage of a PNP-type transistor $Tr_2$ is raised with the lowering of the collector voltage of transistor $Tr_1$ so that transistor $Tr_2$ is turned ON. Accordingly, the collector voltage of transistor $Tr_2$ is raised to turn ON a transistor $Tr_3$ which constitutes part of a Schmitt circuit. A transistor $Tr_4$ is turned OFF in response to the turning ON of transistor $Tr_3$, whereby the collector voltage of transistor $Tr_4$ is raised to turn ON a diode $D_1$. Thus, the voltage level of the output signal of the start-position control circuit 84 is raised to the level "1". When tone arm 4 is positioned on arm rest 48, the output signal of the voltage level "1" is supplied from circuit 84 to an input terminal $T_1$ of the system control circuit Sc. Thus, the output of circuit 84 indicates whether tone arm 4 is positioned on arm rest 48, or not.

As previously mentioned, the output signals x of light-sensitive elements 33a and 33c are supplied to amplifiers 71 and 72 and counter 70. The output of amplifier 71 is supplied to system control circuit Sc, and the output of amplifier 72 is supplied to input terminals $T_2$ and $T_3$ of the speed control circuit 79 shown on FIG. 12A.

The speed control circuit 79 will be described in detail with reference to FIGS. 12A and 13A to 13I. The signal from amplifier 72 is supplied through input terminal $T_2$ to a differentiation circuit consisting of a capacitor $C_1$ and a resistor $R_3$. The output signal $V_1$ (FIG. 13A) of the differentiation circuit is supplied to a base of a transistor $Tr_5$. The transistor $Tr_5$ is instantaneously turned ON at intervals of time t by the output signal $V_1$. As a result thereof, an electric charge applied through a resistor $R_4$ to a capacitor $C_2$ is instantaneously discharged through transistor $Tr_5$ when the latter is turned ON at intervals of time t. A saw-toothed voltage $V_2$ (FIG. 13B) is thereby applied to a base electrode of transistor $Tr_6$ which, with another transistor $Tr_7$, constitutes a differential amplifier. When a voltage Va (represented by a dotted line in FIG. 13B) is applied to a base electrode of transistor $Tr_7$, an intermittent saw-toothed voltage $V_3$ (FIG. 13C) is obtained at the collector electrode of transistor $Tr_6$. Thus, the phase of saw-toothed voltage $V_2$ and the phase of intermittent saw-toothed voltage $V_3$ are in phase-inverted relationship. Since a base electrode of a following PNP-type transistor $Tr_8$ is connected to the collector electrode of transistor $Tr_6$, transistor $Tr_8$ is intermittently turned ON by the intermittent saw-toothed voltage $V_3$.

The collector electrode of transistor $Tr_8$ is shown to be connected through resistors $R_5$ and $R_6$ in series to the −V source. The connecting point of resistors $R_5$ and $R_6$ is connected to a waveform-shaping circuit 79a and to an integrating circuit 79b consisting of a resistor $R_7$ and a capacitor $C_3$. A pulse $V_4$ (FIG. 13D) is obtained at the connecting point of resistors $R_5$ and $R_6$ by reason of waveform-shaping circuit 79a.

The output signal of light-sensitive element 33c, as amplified in amplifier 72, is also supplied through input terminal $T_3$ to a differentiating circuit (FIG 12A) consisting of a capacitor $C_4$ and a resistor $R_8$, and is differentiated thereby. Thus, a signal $V_5$ (FIG. 13F) is supplied to a base electrode of a transistor $Tr_{11}$. A signal $V_6$ (FIG. 13G) is obtained at a collector electrode of transistor $Tr_{11}$, with the signals $V_5$ and $V_6$ being in phase-inverted relationship to each other. The signal $V_6$ is supplied through a coupling capacitor $C_6$ to a base electrode of transistor $Tr_{10}$. Accordingly, transistor $Tr_{10}$ is turned ON at the intervals of time t by signal $V_6$.

Since the voltage at the connecting point of resistors $R_5$ and $R_6$ is at the higher level for the time $t_0-t_1$, a charging current flows into capacitor $C_3$. Accordingly, the voltage of capacitor $C_3$, namely the emitter voltage of transistor $Tr_{10}$, is raised more and more, and, as a result thereof, transistor $Tr_{10}$ is put into the OFF-state, and a diode $D_2$ is turned ON. Accordingly, while capacitor $C_3$ is being charged, another capacitor $C_6$ connected to diode $D_2$ is charged. The capacitance of capacitor $C_6$ is selected to be smaller than that of capacitor $C_3$, so that the voltage of capacitor $C_6$, that is, the collector voltage of transistor $Tr_{10}$, becomes higher in a short time. The voltage of capacitor $C_6$ is applied to a gate electrode of a field effect transistor FET in circuit 79 to turn ON the latter.

The voltage at the connecting point of resistors $R_5$ and $R_6$ suddenly lowers at the time $t_1$ and, at the same time, the electric charge on capacitor $C_3$ is discharged through resistors $R_7$ and $R_6$ to the −V power source. Simultaneously, the signal $V_6$ (FIG. 13G) is supplied to the base electrode of transistor $Tr_{10}$. When the collector voltage of transistor $Tr_{10}$ is higher than its emitter voltage, transistor $Tr_{10}$ is instantaneously turned ON in synchronization with signal $V_6$, and the electric charge of capacitor $C_6$ is discharged through transistor $Tr_{10}$ into capacitor $C_3$.

As a result, the emitter voltage of transistor $Tr_{10}$ changes with time, as indicated at $V_7$ on FIG. 13E, in accordance with the charge and discharge of capacitor $C_3$. A transistor $Tr_9$ in waveform-shaping circuit 79a is turned ON with the falling portion of emitter voltage $V_7$ to perfectly discharge capacitor $C_3$. Accordingly, continuous raising of the level of the emitter voltage of transistor $Tr_{10}$ is avoided. The mean collector voltage of transistor $Tr_9$ is substantially at a constant level when transistor $Tr_9$ is turned OFF. In other words, the gate voltage of the FET in speed control circuit 79 is maintained substantially at a constant level. A source voltage $V_8$ (FIG. 13H) of the FET is maintained at a constant level which is higher than the voltage ($-12$ volts) of the $-V$-power source, and a drain voltage $V_9$ (FIG. 13I) of the FET is maintained at another constant level which is lower than the voltage ($+12$ volts) of the $+V$ power source.

Thus, two control signals differing from each other in polarity are obtained from the FET constituting an output stage of speed control circuit 79. The drain voltage $V_9$ of the FET is applied to a base electrode of a transistor $Tr_{12}$ of forward-backward discriminator 77, and source voltage $V_8$ of the FET applied to a base electrode of a transistor $Tr_{13}$ of forward-backward discriminator 77. Since the drain voltage $V_9$ is lower than $+12$ volts, the PNP-type transistor $Tr_{12}$ is turned ON, and, since the source voltage $V_8$ is higher than $-12$ volts, the NPN-type transistor $Tr_{13}$ is turned ON.

When tone arm 4 is moved in the lead-in direction, an output signal of a voltage converter 105 becomes "1" in response to a control signal supplied through an input terminal $T_{11}$ from system control circuit Sc, and an output signal of another voltage converter 106 becomes "0" in response to a control signal supplied through an input terminal $T_{12}$ from system control circuit Sc. A transistor $Tr_{14a}$ is turned ON by the output signal of voltage converter 105 to shunt an anode of the diode $D_3$ to the $-V$-power source and, therefore, the output signal of forward-backward discriminator 77 is not supplied to drive circit 75.

A transistor $Tr_{14b}$ also included in discriminator 77 is turned OFF by the output signal of voltage converter 106. Since transistor $Tr_{13}$ is already turned ON, a diode $D_4$ is turned ON so as to lower the voltage at the movable contact of a variable resistor $VR_1$ in lateral balance circuit 78. By reason of such lowered voltage at resistor $VR_1$, a differentiating amplifier constituted by transistors $Tr_{15}$ and $Tr_{16}$ is not operated in horizontal drive circuit 75. The collector voltage of transistor $Tr_{15}$ does not decrease and, accordingly, a PNP-type transistor $Tr_{17}$ is turned OFF. Therefore, current does not flow through transistor $Tr_{17}$ from the $+V$ power source into coil 13 of horizontal drive motor 11.

On the other hand, when the voltage at the movable contact of variable resistor $VR_1$ decreases, another differential amplifier constituted by PNP-type transistors $Tr_{18}$ and $Tr_{19}$ is operated. The transistor $Tr_{18}$ is turned ON to increase its collector voltage. Since a base electrode of a transistor $Tr_{20}$ is connected to the collector electrode of transistor $Tr_{18}$, the transistor $Tr_{20}$ is turned ON. Accordingly, a forward current $I_1$ flows through the electrical path from the ground or earth line E through coil 13 and transistor $Tr_{20}$ to the $-V$ power source. A rotational torque is imparted to horizontal drive motor 11 due to the forward current $I_1$ to drive tone arm 4 in the lead-in direction.

As previously state, there is extremely low frictional resistance to turning of tone arm 4. Accordingly, there is the danger that the tone arm may be excessively moved in the lead-in direction by the initial drive force of horizontal drive motor 11. In order to eliminate such danger, the brake circuit 82 is designed to be operated in response to the output signal "1" of voltage converter 105 so as to brake horizontal drive motor 11.

When the output signal of voltage converter 105 becomes "1", a transistor $Tr_{25}$ is turned ON in braking circuit 82. Therefore, the collector voltage of transistor $Tr_{25}$ is lowered and a PNP-type transistor $Tr_{26}$ is turned ON. A transistor $Tr_{28}$ is put in the OFF-state. Accordingly, a braking (backward) current $I_2$ flows through the electrical path from the $+V$ power source through transistor $Tr_{26}$ and coil 13 to the earth line E. The forward current $I_1$ is opposite to the braking current $I_2$ and the absolute value $|I_1|$ of the forward current is designed to be larger than the absolute value $|I_2|$ of the braking current, so that tone arm 4 is braked or slowly moved in the lead-in direction.

When the free end of tone arm 4 has come directly over the peripheral sound-less portion 50a of record disc 50, horizontal movement of the tone arm is stopped and the tone arm 4 moves down onto the record disc to start a record play operation.

Figure 14:
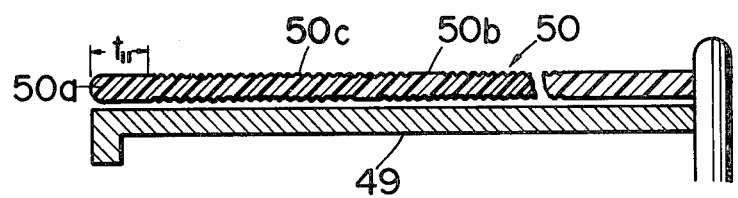
FIG. 14 is a cross-sectional view of a part of a turntable and a record disc and to which reference will be made in explaining the position control operation of the horizontal control system.
Figure 15A:
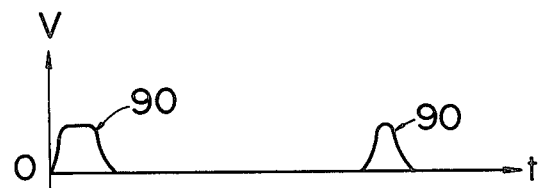
FIGS. 15A to 15C are waveforms to which reference will also be made in explaining the position control operation of the horizontal control system.
Figure 15B:

The position control operation of tone arm 4 will now be described with reference to FIGS. 14–16.

When the free end of tone arm 4 has come directly over the peripheral sound-less portion 50a (FIG. 14) of a record disc 50 on turntable 49, much light is received by light-sensitive element 60 of sound-less portion sensor 57 (FIG. 10) as the light from light-emitting element 59 is reflected by the peripheral sound-less portion 50a. Accordingly, the output voltage of light-sensitive element 60 is increased and such voltage level change is detected by sound-less portion discriminator 83. Thus, the horizontal position of tone arm 4 is detected and the corresponding output of sound-less portion discriminator 83 is supplied to system control circuit Sc. The resulting control signals from system control circuit Sc are supplied to counter circuit 70, position control circuit 74 and vertical drive circuit 88.

More particularly, when the free end of tone arm 4 has come directly over peripheral sound-less portion 50a of record disc 50, an output signal 90 (FIG. 15A) is generated by light-sensitive element 60. The output signal 90 is wave-shaped to a pulse signal 91 (FIG. 15B) in sound-less portion discriminator 83. The pulse signal 91 is suitably generated by sound-less portion discriminator 83 only when output signal 90 from sensor 57 is higher than a certain voltage level. Accordingly, the time width $t_{10}$ is shorter than the time $t_{11}$ during which the free end of tone arm 4 is directly over the peripheral sound-less portion 50a of record disc 50. The output signal 91 from sound-less portion discriminator 83 is supplied to system control circuit Sc through an input terminal $T_{10}$ (FIG. 12A). In response to signal 91, system control circuit Sc supplies a control signal through an input terminal $T_{13}$ to the counter circuit 70.

Figure 15C:
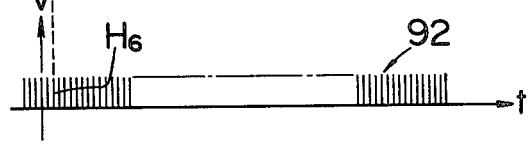

On the other hand, pulse signals 92 (FIG. 15C) are continuously generated by the light-sensitive elements 33a and 33c in response to horizontal movement of tone arm 4. The leading edge of output signal 91 (FIG. 15B) may be made to occur in synchronism with the sixth pulse $H_6$ of pulse signals 92 (FIG. 15C). With such synchronization, counter circuit 70 is made operative to start to count the pulse signals 92. As circuit 70 counts, the voltage level of the output signal of D/A converter 73 moves toward a zero voltage level from a negative voltage level. As a result of the foregoing, a transistor $Tr_{24}$ is turned ON in position control circuit 74 (FIG. 12A).

Simultaneously with the application of a control signal from system control circuit Sc to counter circuit 71, a control signal is aupplied from circuit Sc through an input terminal $T_4$ (FIG. 12A) to a base of a transistor $Tr_{21}$ in position control circuit 74 so that transistor $Tr_{21}$ is turned ON. With the lowering of the collector voltage of transistor $Tr_{21}$, a transistor $Tr_{22}$ is turned ON and, consequently, a switching transistor $Tr_{23}$ is also turned ON. Accordingly, the emitter voltage of transistor $Tr_{24}$ becomes nearly zero and, as a result thereof, the voltage of the movable contact of variable resistor $VR_1$ and, hence, the base voltage of transistor $Tr_{15}$ become nearly zero. Thus, horizontal drive circuit 75 is changed-over from control by speed control circuit 79 to control by position control circuit 74.

A resistor $R_{10}$ and a capacitor $C_{10}$ are connected in parallel with each other between the emitter of transistor $Tr_{24}$ and the movable contact of resistor $VR_1$ to function to relax a dash current which flows at the time when transistors $Tr_{23}$ and $Tr_{24}$ are turned ON or OFF, and which would otherwise cause vibration of tone arm 4 in the horizontal direction.

When the base voltage of transistor $Tr_{15}$ becomes nearly zero, as above described, transistor $Tr_{18}$ is turned OFF and, therefore, transistor $Tr_{20}$ is also turned OFF. Accordingly, the current $I_1$ which flowed through the coil 13 is intercepted or blocked by transistor $Tr_{20}$, so that the driving force of horizontal drive motor 11 ceases and tone arm 4 stops.

Figure 16:
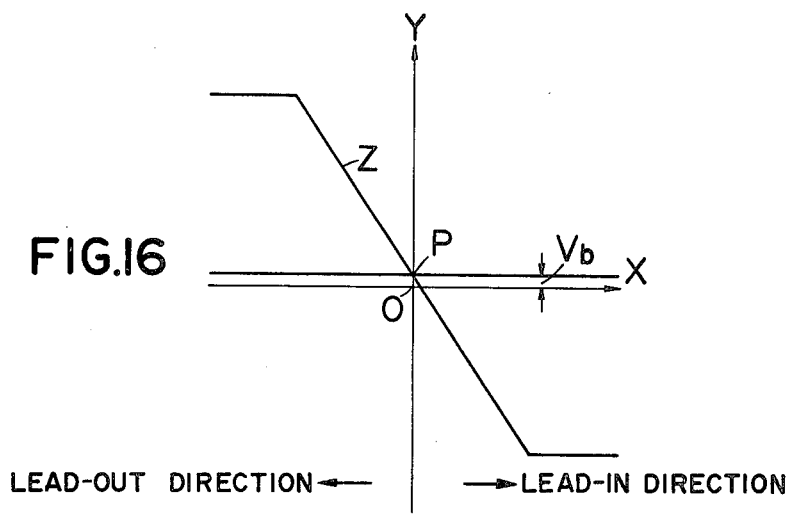
FIG. 16 is a graph illustrating the position control operation of the tone arm.

Referring now to FIG. 16 in which the X-axis represents the horizontal position of tone arm 4 and the Y-axis represents the base voltage level of transistor $Tr_{15}$, it will be assumed that the tone arm is to be stopped at the position X=0. As above described, when tone arm 4 has reached the stop position X=0, the forward current $I_1$ is intercepted by transistor $Tr_{20}$. However, the braking current $I_2$ still flows through coil 13. Accordingly, tone arm 4 starts to be moved in the lead-out direction by braking current $I_2$. At that time, the output signal of D/A converter 73 is changed-over to negative polarity and, therefore, the base voltage of transistor $Tr_{15}$ again becomes negative. As a result of the foregoing, transistor $Tr_{20}$ is again turned ON, and the forward current $I_1$ again flows through coil 13 to move tone arm 4 in the lead-in direction.

Thus, the tone arm is slightly vibrated in the horizontal direction, between positions corresponding to a number of the pulse signals 92 of FIG. 15C. The output of D/A converter 73 varies with the slight vibration of tone arm 4. The base voltage of transistor $Tr_{15}$ is instantaneously and alternately changed-over between negative and positive polarities with a center at the point P on FIG. 16, in the manner represented by the oblique line Z on FIG. 16. As a result, tone arm 4 is stopped stably at the position X=0. As shown on FIG. 16, a slight bias voltage Vb is always applied to the base electrode of transistor $Tr_{15}$ for the lateral balance of tone arm 4.

After the horizontal position of tone arm 4 is controlled in the above described manner, a control signal is supplied to vertical drive circuit 88 from system control circuit Sc, to drive the vertical drive motor 20. Accordingly, tone arm 4 is moved down to engage stylus 8 with the peripheral sound-less portion 50a of record disc 50. Thus, the lead-in operation is completed, and a record play starts.

In the record play, only the slight voltage Vb for the lateral balance of tone arm 4 is supplied as the input signal to the horizontal drive circuit 75 from the lateral balance circuit 78. The output signal of speed control circuit 79 ceases. When stylus 8 is positioned on sound groove portion 50c, the output signal of light-sensitive element 60 of sound-less portion sensor 57 is at a relatively low level, and, in response thereto, system control circuit Sc causes position control circuit 74 to cease providing an output signal.

During record play, a backward current $I_3$ and braking current $I_2$ always flow through coil 13 of horizontal drive motor 11. Further, a current proportional to the current flowing through coil 26 of the vertical drive motor 20, or proportional to the stylus pressure is always supplied through an input terminal $T_5$ (FIG. 12A) from inside force cancelling circuit 89 to a base electrode of a transistor $Tr_{29}$ (FIG. 12B), so that a forward current $I_4$ flows through coil 13 in opposition to currents $I_2$ and $I_3$. As a result, a force for cancelling the inside force is imparted to tone arm 4. It is very desirable that the inside cancelling force is proportional to the stylus pressure.

The lead-out operation of tone arm 4 will now be described. When stylus 8 reaches the end of the sound groove and engages the unrecorded run-out groove, the speed of the horizontal movement of tone arm 4 is increased. As a result of the foregoing, the output signal of speed control circuit 79 is lowered to turn ON a PNP-type transistor $Tr_{30}$ which constitutes a differential amplifier together with another PNP-type transistor $Tr_{31}$ in the first stage of lead-out detecting circuit 80. The turning ON of transistor $Tr_{30}$ increases its collector voltage so as to turn ON a transistor $Tr_{32}$. The collector voltage of transistor $Tr_{32}$ is lowered to turn ON a transistor $Tr_{33}$ constituting part of a Schmitt circuit, and a transistor $Tr_{34}$ is turned OFF. Accordingly, the voltage at the connecting point of resistors $R_{11}$ and $R_{12}$ connected between the emitter of transistor $Tr_{34}$ and the $-V$-power source becomes substantially $-12$ volts.

Such voltage at the connecting point of resistors $R_{11}$ and $R_{12}$ is the output signal of lead-out detecting circuit 80 which is supplied to an input terminal $T_6$ of system control circuit Sc. In response to the output signal from circuit 80 becoming substantially $-12$ volts, a control signal is supplied from system control circuit Sc to vertical drive circuit 88 to drive vertical drive motor 20 for raising tone arm 4.

At any time when stylus 8 of tone arm 4 has reached an intermediate sound-less portion 50b of record disc 50, the speed of the horizontal movement of the tone arm 4 is also increased. Accordingly, there is the danger that the tone arm 4 will be raised inadvertently by the above described output signal of lead-out detecting circuit 80. In order to eliminate such danger, a gate circuit 110 (FIG. 12A) is connected to a terminal $T_7$ of system control circuit Sc and has its operation controlled by the output signal of counter circuit 70. More particularly, gate circuit 110 is put in its OFF-state until counter circuit 70 counts the number of pulse signals 92 from light-sensitive elements 33a and 33c corresponding to the end of a record. Accordingly, when the speed of the horizontal movement of tone arm 4 increases at an intermediate sound-less portion 50b of the record disc 50, the output signal of lead-out detecting circuit 80 is not supplied to system control circuit Sc by reason of the OFF state of gate circuit 110. Therefore, tone arm 4 is not unexpectedly raised at the intermediate sound-less portion 50b.

When tone arm 4 is raised at the end of a record, suitable control signals are supplied from system control circuit Sc to voltage converters 105 and 106 so that the output signal of voltage converter 105 becomes "0" and the output signal of voltage converter 106 becomes "1". As a result, transistor $Tr_{14a}$ of forward-backward discriminating circuit 77 is turned OFF, and transistor $Tr_{15}$ of horizontal drive circuit 75 is turned ON. The output signal of speed control circuit 79 is supplied through forward-backward discriminating circuit 77 to horizontal drive circuit 75 so as to turn ON transistor $Tr_{15}$. Accordingly, transistor $Tr_{17}$ is turned ON and a backward current $I_3$ flows through coil 13 to move tone arm 4 in the lead-out direction.

On the other hand, transistor $Tr_{27}$ and the transistor $Tr_{28}$ of braking circuit 82 are turned ON in response to the output signal "1" of voltage converter 106. Accordingly, a braking current $I_5$ opposite to the current $I_3$ flows through the electrical path from the ground or earth line E through coil 13 and transistor $Tr_{28}$ to $-V$-power source. Since the absolute value $|I_3|$ of the reverse current is larger than the absolute value $|I_5|$ of the braking current, tone arm 4 is braked so as to be slowly moved in the lead-out direction.

When tone arm 4 comes close to arm rest 48, oblong hole 40 and slit 45 are again aligned with each other so that the output signal of light-sensitive element 33b is increased in level. The level change of the output of light-sensitive element 33b is detected by start-position control circuit 84 which provides a corresponding detecting output to system control circuit Sc so that a control signal from the latter causes vertical drive circuit 88 to drive the vertical drive motor 20 in the direction to lower arm 4. The tone arm 4 is moved down onto arm rest 48 and the fact that tone arm 4 is positioned on arm rest 48 is detected by vertical position detector 52, whereupon, vertical control system Vc becomes inoperative with tone arm 4 on arm rest 48.

Thus, an operating sequence comprised of a lead-in operation, a record playing and a lead-out operation is completed.

In the above description of an operating sequence, it has been assumed that the start switch has been turned on in the normal condition, that is, with the tone arm positioned on arm rest 48. However, the record player according to the herein described embodiment is designed so that, if the start switch is turned on at a time when tone arm 4 is not positioned on arm rest 48, the tone arm is first returned to arm rest 48, and then the previously described sequence of operations is started.

If tone arm 4 is not correctly positioned on arm rest 48 when the start switch is actuated, the light from light-emitting element 32b is not received by light-sensitive element 33b, since oblong hole 40 is not aligned with slit 45. Accordingly, transistor $Tr_1$ and, therefore, the following transistors $Tr_2$, $Tr_3$ and $Tr_4$ of start position control circuit 84 are turned OFF. The output voltage of start position control circuit 84 is thus a relatively higher level and, in response thereto, system control circuit Sc is set in its lead-out control condition.

When the start switch is actuated or turned on in the above described condition, that is, with tone arm 4 off arm rest 48, a corresponding control signal is first supplied to vertical drive circuit 88 from system control circuit Sc to drive the vertical drive motor 20 in the direction for raising tone arm 4.

Next, in response to the control signals from system control circuit Sc, the voltage level of the output signal of voltage converter 105 becomes "0", and the voltage level of the output signal of the other voltage converter 106 becomes "1". The transistor $Tr_{14a}$ is turned OFF and transistor $Tr_{14b}$ is turned ON in the forward-backward discriminating circuit 77. Accordingly, the output signal of speed control circuit 79 is supplied through forward-backward discriminating circuit 77 to horizontal drive circuit 75. The base voltage of the transistor $Tr_{15}$ is raised and, as a result, a reverse current $I_3$ flows through coil 13, in the same manner as in the above-described lead-out operation, to initially cause return of tone arm 4 to arm rest 48.

When tone arm 4 has reached arm rest 48, oblong hole 40 is aligned with the slit 45, and the light from light-emitting element 32b is received by light-sensitive element 33b. As a result, transistor $Tr_1$ of start position control circuit 84 is turned ON and, then, tone arm 4 is moved in the lead-in direction, in the previously-described manner.

When an external force in the lead-in direction is erroneously applied, for example, by hand, to the tone arm 4 during the lead-in operation to increase the speed of the horizontal movement of the tone arm 4, the pitch or period between the pulse signals of light-emitting elements 33a and 33c is lessened. As a result, the time interval t of the differentiation signal $V_1$ (FIG. 13A) is lessened and, therefore, the time width of the pulse signal $V_4$ (FIG. 13D) is narrowed. The gate voltage of the FET in circuit 79, the drain voltage $V_9$ (FIG. 13I) of such FET and the source voltage $V_8$ (FIG. 13H) thereof are respectively lowered. Therefore, the base voltage of transistor $Tr_{13}$ decreases to decrease the collector-emitter voltage thereof. Accordingly, the base voltage of transistor $TR_{15}$ comes closer to the zero level, and the base voltage of transistor $Tr_{20}$ is lowered to decrease the forward current $I_1$. The braking force due to the braking current $I_2$ becomes relatively high so as to brake the speed of horizontal movement of tone arm 4 in the lead-in direction.

When an external force in the lead-out direction is erroneously applied, for example, by hand, to tone arm 4 during the lead-out operation to increase the speed of the movement of the tone arm 4, the pitch or period between the output signals of the light-sensitive elements 33a and 33c is again lessened. As a result, the time interval t of the differentiation signals $V_1$ (FIG. 13A) is lessened and, therefore, the time width of the pulse signal $V_4$ (FIG. 13D) is narrowed. The gate voltage of the FET in circuit 79, the drain voltage $V_9$ (FIG. 13I) of such FET and the source voltage $V_8$ (FIG. 13H) thereof are respectively lowered. Since transistor $Tr_{14a}$ is turned OFF, the output signal of speed control circuit 79 is supplied through forward-backward discriminating circuit 77 to horizontal drive circuit 75. The base voltage of transittor $Tr_{15}$ is lowered to decrease the reverse current $I_3$. The braking force due to the braking current $I_5$ becomes relatively high so as to brake the speed of horizontal movement of tone arm 4 in the lead-out direction.

Figure 12B:
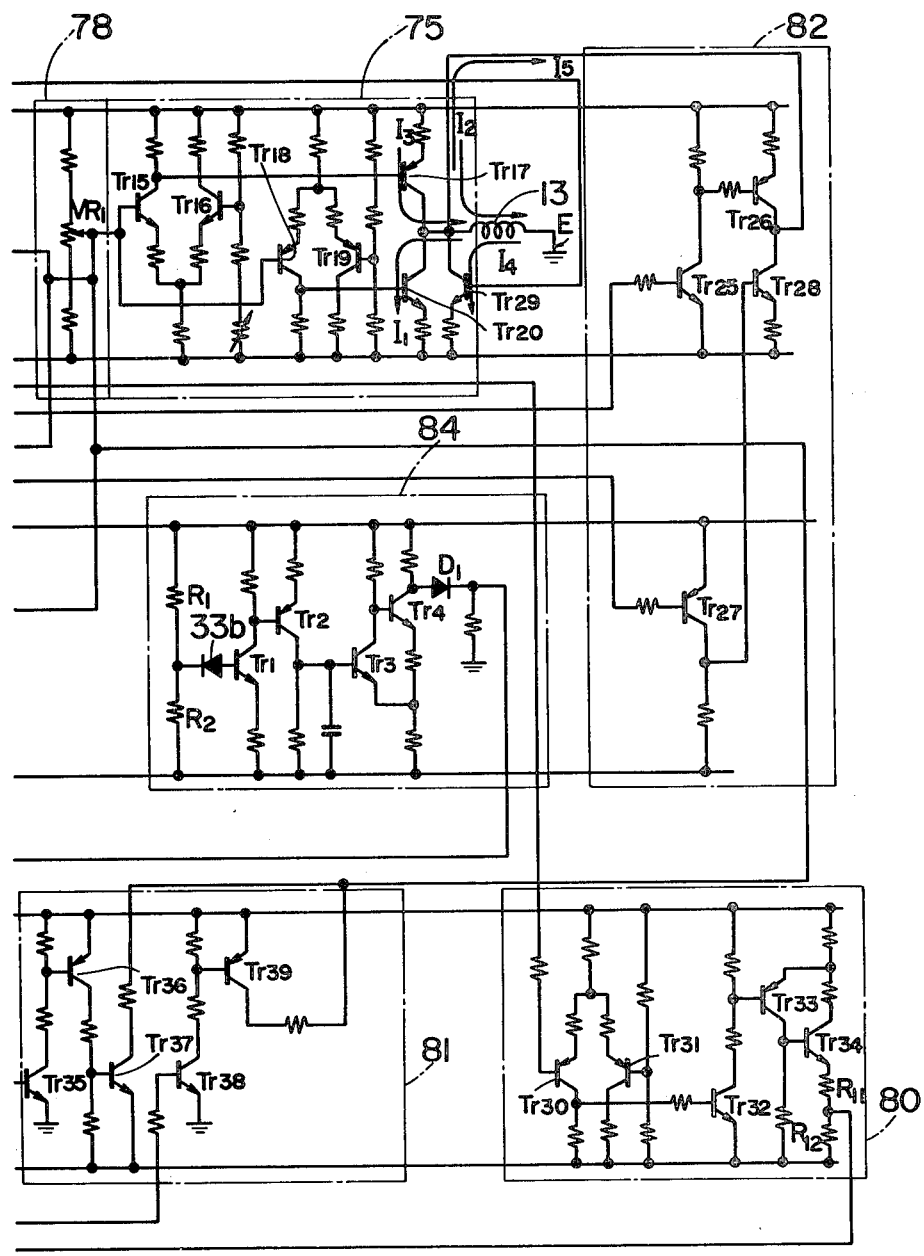

In the above-described embodiment, desirable structural arrangements for the position control circuit 74, lateral balancing circuit 78, braking circuit 82 and inside force cancelling circuit 89, constituting important components of the horizontal control system $H_c$, are illustrated in detail on FIGS. 11B, 12A and 12B, but it is to be understood that various modifications or other arrangements may be used for such circuits.

Figure 17:
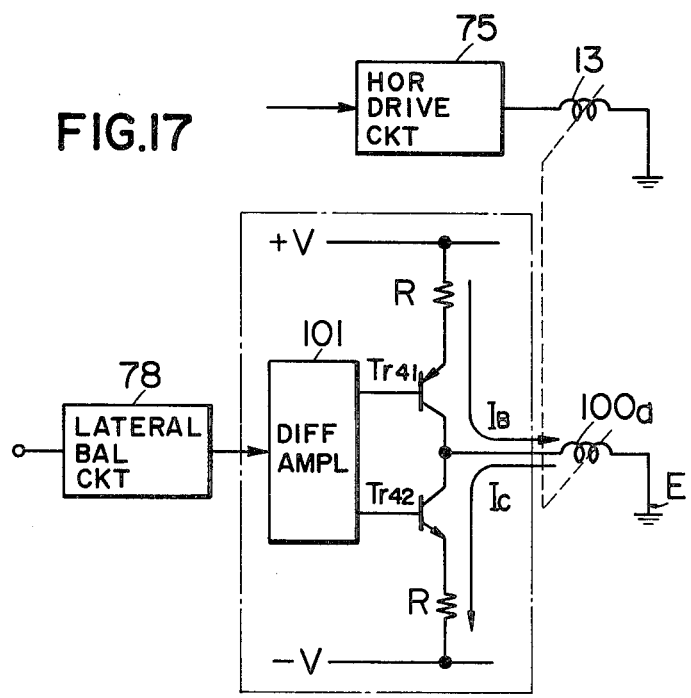
FIG. 17 is a circuit diagram showing a modification of a lateral balancing circuit included in the horizontal control system of FIGS. 12A and 12B.

For example, a modification of the arrangement of the lateral balancing circuit 78 is shown on FIG. 17. In the embodiment shown on FIGS. 12A and 12B, the variable resistor $VR_1$ for applying the bias voltage to the base of transistor $Tr_{15}$ is adjusted so as to feed to coil 13 such a small current which will compensate for the unbalance of tone arm 4 due to an external abnormal force. However, in the modification of FIG. 17, another coil 100a for lateral balancing is arranged besides coil 13 and is movable with the latter. The output signal of the lateral balancing circuit 78 is supplied to a differential amplifier 101, and transistors $Tr_{41}$ and $Tr_{42}$ are controlled with output signals from differential amplifier 101. When the one transistor $Tr_{41}$ is turned ON, a current $I_B$ flows through the electrical path from the +V-power source through transistor $Tr_{41}$ and coil 100a to the earth line E. When the other transistor $Tr_{42}$ is turned ON, another current $I_C$ flows through the electrical path from the earth line E through coil 100a and transistor $Tr_{42}$ to the −V-power source. The lateral unbalance of the tone arm 4 is compensated by the current $I_B$ or $I_C$.

Figure 18:
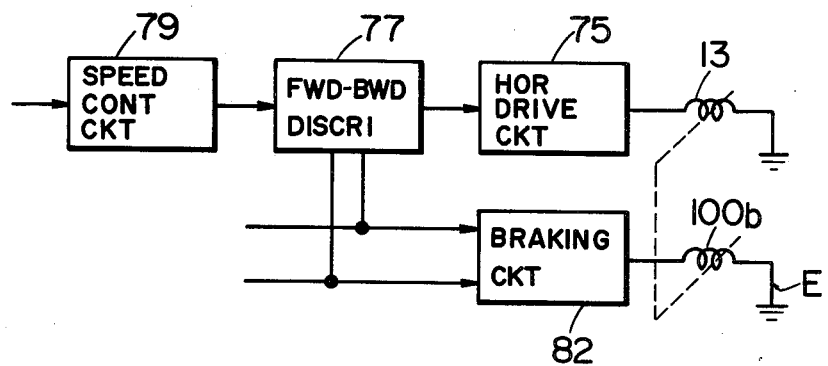
FIG. 18 is a circuit diagram showing a modification of a braking circuit also included in the horizontal control system of FIGS. 12A and 12B.

FIG. 18 shows a modification of the arrangement of braking circuit 82 in which, instead of causing the braking current to flow through coil 13 of the horizontal drive motor 11 to impart the braking force to the tone arm 4, an additional braking coil 100b receives the braking current from circuit 82 and is arranged besides coil 13 so as to move with the latter.

Figure 19:
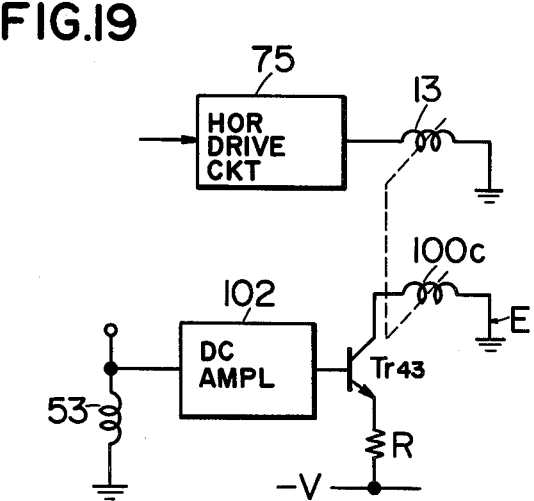
FIG. 19 is a circuit diagram showing a modification of an inside force cancelling circuit also included in the horizontal control system of FIGS. 12A and 12B.

FIG. 19 shows a modification of the inside force cancelling circuit 89 in which the current to cancel the inside force was made to flow through coil 13 of the horizontal drive motor 11. In the embodiment of FIG. 19, another coil 100c for cancelling the inside force is arranged besides the coil 13 to move with the latter, and is connected to the collector-emitter circuit of a transistor $Tr_{43}$ which has its base connected through a DC amplifier 102 to the coil 53 of vertical position detector 52.

Figure 20:
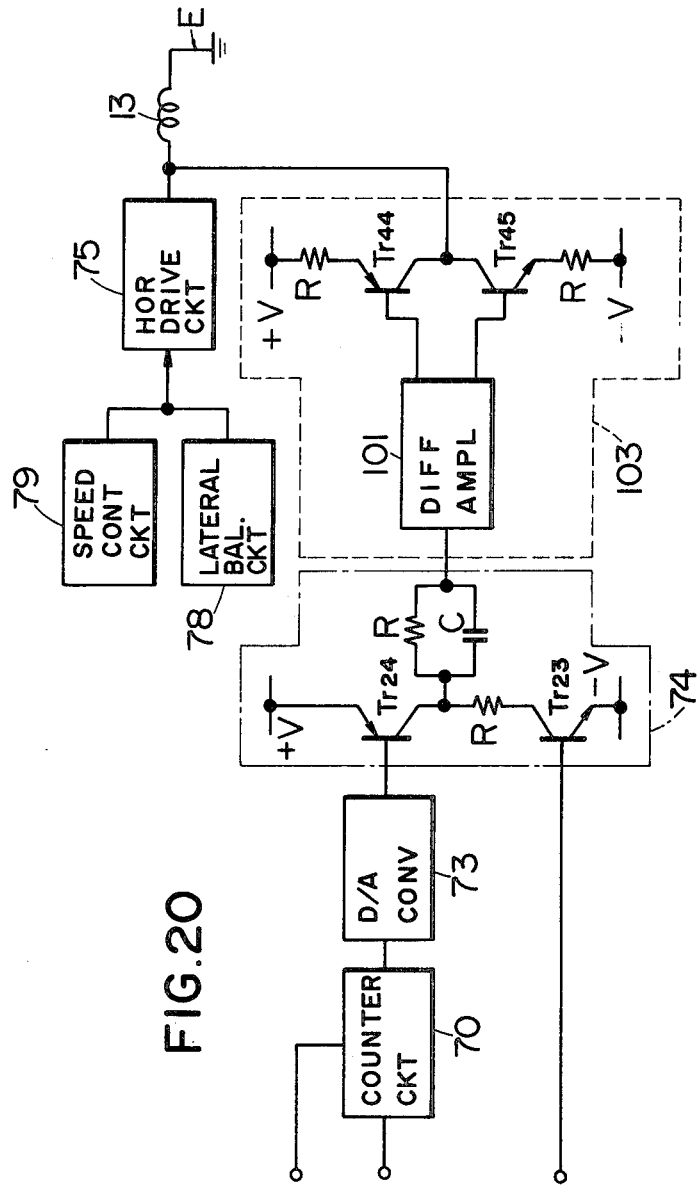
FIG. 20 is a circuit diagram showing a modification of a position control circuit included in the horizontal control system of FIGS. 12A and 12B.

FIG. 20 shows one modification of the position control circuit 74 in which the output signal of position control circuit 74 was supplied to horizontal drive circuit 75 for driving the latter. In the embodiment of FIG. 20, a drive circuit 103 for position control is connected to the output terminal of position control circuit 74 and supplies a position control current to coil 13 of the horizontal drive motor 11.

Figure 21:
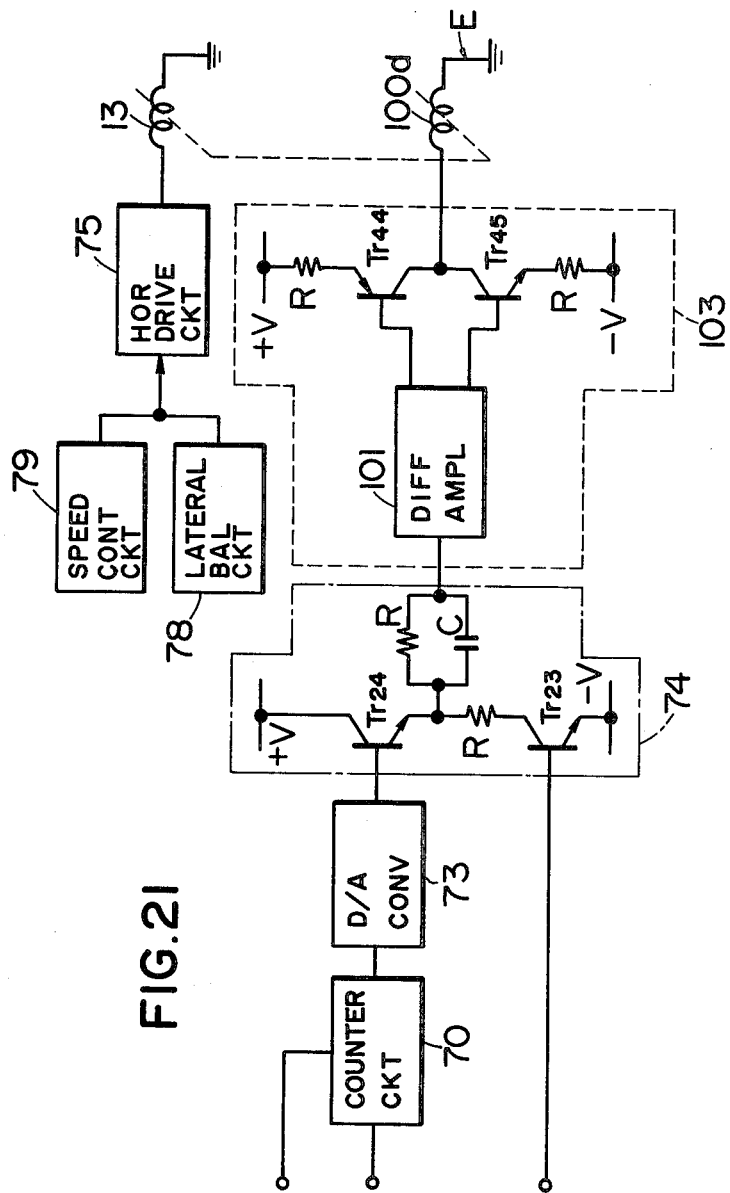
FIG. 21 is a circuit diagram of another modification of the position control circuit.

If desired, another coil 100d for position control may be arranged besides the coil 13 to move with the latter, as shown in FIG. 21, and in that case the position control current is made to flow through coil 100d from the drive circuit 103.

In each of FIGS. 20 and 21, the drive circuit 103 comprises a differential amplifier 101 and switching transistors $Tr_{44}$ and $Tr_{45}$. One or the other of the transistors $Tr_{44}$ and $Tr_{45}$ is turned ON by the output of differential amplifier 101 to change-over the direction of current flowing through the coil 13 or 100d.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tone arm assembly comprising a tone arm having a stylus at one end thereof, mounting means mounting said tone arm for vertical and horizontal movements in respect to a turntable, first motor means mechanically coupled to said tone arm for moving said tone arm in the vertical direction with respect to a record disc on the turntable, second motor means mechanically coupled to said tone arm for moving said tone arm in the horizontal direction with respect to said record disc, a first motor drive circuit for supplying an energizing current to said first motor means so as to move said tone arm between an inoperative up-position and a reproducing position on said record disc, a second motor drive circuit for supplying an energizing current to said second motor means in such a manner that said tone arm is moved between an inoperative rest position and said up-position above said reproducing position on said record disc, and brake circuit means for supplying to said second motor means a braking current, having a sense opposite to that of the energizing current supplied to said second motor means so as to brake the latter while said second motor means is energized by said second motor drive circuit.

2. A tone arm assembly according to claim 1; in which said brake circuit means is connected to said second motor drive circuit; said second motor drive circuit includes a first series circuit having a first transistor connected to a first power source, said second motor means includes a coil connected in series with said first transistor and a reference line, and said second motor drive circuit further includes a second series circuit having a second transistor connected to a second power source and said coil of the second motor means being connected in series with said second transistor; and said brake circuit means includes at least two transistors which are connected to a common point of said first and second transistors and said coil of the second motor means and which are controlled to feed said coil of said second motor means with a reverse current as said braking current when said first and second series circuits are selectively energized.

3. A tone arm assembly according to claim 1; further comprising detecting means for detecting when said tone arm has been positioned directly above the record disc, and means for energizing said first motor drive circuit in response to said detecting means.

4. A tone arm assembly according to claim 3; in which said detecting means includes a light-emitting element and a light-sensitive element arranged on said tone arm, and the light of said light-emitting element, reflected by the record disc is received by said light-sensitive element to detect when said tone arm has reached a position directly above said record disc.

5. A tone arm assembly according to claim 1; further comprising detecting means for detecting whether or not said tone arm is positioned in said rest position at the start of an operating cycle said tone arm, and circuit means for energizing said second motor drive circuit to return said tone arm to said rest position when said detecting means detects that said tone arm is not positioned in said rest position and for energizing said second motor drive circuit to move said tone arm toward said record disc when said detecting means has detected that said tone arm has returned to said rest position.

6. A tone arm assembly according to claim 5; in which said detecting means includes a movable plate having a first opening and being capable of moving in the horizontal direction together with said tone arm, a stationary plate having a second opening, a light-emitting element and a light-sensitive element, said first and second openings being aligned with each other and the light from said light-emitting element being received by said light-sensitive element through said aligned openings when said tone arm is positioned in said rest position.

7. A tone arm assembly according to claim *; further comprising detecting means for detecting that said tone arm is moved toward the center of said record disc at a relatively high speed when said stylus reaches the end of the sound groove of said record disc, circuit means for energizing said first motor drive circuit with the output of said detecting means so as to move said tone arm from the record disc to said inoperative up-position, and circuit means for returning said tone arm to said rest position from said up-position through said second motor drive circuit.

8. A tone arm assembly according to claim 7; in which said detecting means includes a movable plate having numerous slits and being capable of moving in the horizontal direction together with said tone arm, a stationary plate having numerous slits, a light-emitting means and a light-sensitive means, the light from said light-emitting means being transmitted through the aligned ones of said slits to said light-sensitive means.

9. A tone arm assembly according to claim 1; further comprising direction indicating means for generating two different output signals in accordance with the direction of horizontal movement of said tone arm, and a control signal producing circuit for supplying signals different in level to said second motor drive circuit with the output signal of said direction indicating means, said second motor drive circuit being energized with the output of said control signal producing circuit.

10. A tone arm assembly according to claim 9; in which said direction indicating means includes a plate movable in the horizontal direction together with said tone arm and having slits, and a stationary plate having two rows of slits, first and second light-emitting elements and first and second light-sensitive elements, the light from said light-emitting elements being received by said light-sensitive elements through the aligned slits of the movable plate and the stationary plate.

11. A tone arm assembly comprising a tone arm having a stylus at one end thereof; mounting means mounting said tone arm for vertical and horizontal movements in respect to a turntable; first motor means mechanically coupled to said tone arm for moving said tone arm in the vertical direction with respect to a record disc on the turntable; second motor means mechanically coupled to said tone arm for moving said tone arm in the horizontal direction with respect to said record disc and having an electrically energizable coil; a first motor drive circuit for energizing said first motor means so as to move said tone arm between an inoperative up-position and a reproducing position on said record disc; a second motor drive circuit for energizing said second motor means in such a manner that said tone arm is moved between an inoperative rest position and said up-position above said reproducing position on said record disc, said second motor drive circuit including a first series circuit having a first transistor connected to a first power source, a second series circuit having a second transistor connected in series with a second power source and said coil of said second motor means, and a third transistor connected to said coil of the second motor means; brake circuit means for supplying a current to said second motor means so as to brake the latter while said second motor means is energized by said second motor drive circuit; and an inside force cancelling circuit controlling said third transistor so that a force for cancelling an inside force is applied through said second motor means and said tone arm to said stylus.

12. A tone arm assembly comprising a tone arm having a stylus at one end thereof; mounting means mounting said tone arm for vertical and horizontal movements in respect to a turntable; first motor means mechanically coupled to said tone arm for moving said tone arm in the vertical direction with respect to a record disc on the turntable; second motor means mechanically coupled to said tone arm for moving said tone arm in the horizontal direction with respect to said record disc and having an electrically energizable coil; a first motor drive circuit for energizing said first motor means so as to move said tone arm between an inoperative up-position and a reproducing position on said record disc; a second motor drive circuit for energizing said second motor means in such a manner that said tone arm is moved between an inoperative rest position and said up-position above said reproducing position on said record disc, said second motor drive circuit including a first series circuit having a first transistor connected to a first power source, a second series circuit having a second transistor connected in series with a second power source and said coil of said second motor means; brake circuit means for supplying a current to said second motor means so as to brake the latter while said second motor means is energized by said second motor drive circuit; and a lateral balancing circuit connected to said second motor drive circuit for applying a lateral force through said first series circuit to said stylus, said lateral balancing circuit including a variable resistor for varying said lateral force in correspondence with the adjustment of said variable resistor.

13. A tone arm assembly comprising a tone arm having a stylus at one end thereof, mounting means mounting said tone arm for vertical and horizontal movements in respect to a turntable, first motor means mechanically coupled to said tne arm for moving said tone arm in the vertical direction with respect to a record disc on the turntable, second motor means mechanically coupled to said tone arm for moving said tone arm in the horizontal direction with respect to said record disc, a first motor drive circuit for energizing said first motor means so as to move said tone arm between an inoperative up-position and a reproducing position on said record disc, a second motor drive circuit for energizing said second motor means in such a manner that said tone arm is moved between an inoperative rest position to said up-position above said reproducing position on said record disc, detecting means for detecting whether or not said tone arm is positioned in said rest position at the start of an operating cycle of said tone arm, and circuit means for energizing said second motor drive circuit to return said tone arm to said rest position when said detecting means detects that said tone arm is not positioned on said rest position and for energizing said second motor drive circuit to move said tone arm toward said record disc when said detecting means has detected that said tone arm has returned to said rest position.

14. A tone arm assembly according to claim 13; further comprising second detecting means for detecting the speed of horizontal movement of said tone arm, and further circuit means supplied with the output of said second detecting means for supplying a predetermined output to said second motor drive circuit while said tone arm is moved at a predetermined speed, said tone arm being braked through said second motor drive circuit by said further circuit means when said tone arm is moved at a speed higher than said predetermined speed.

15. A tone arm assembly according to claim 14; further comprising third detecting means for detecting that said tone arm is moved toward the center of the record disc at a relatively high speed when said stylus reaches the end of the sound groove of said record disc, energizing circuit means for energizing said first motor drive circuit with the output of said third detecting means so to move said tone arm from the record disc to said inoperative up-position, and returning circuit means for returning said tone arm to said rest position from said up-position through said second motor drive circuit.

16. A tone arm assembly comprising a tone arm having a stylus at one end thereof, mounting means mounting said tone arm for vertical and horizontal movements in respect to a turntable, first motor means mechanically coupled to said tone arm for moving said tone arm in the vertical direction with respect to a record disc on the turntable, second motor means mechanically coupled to said tone arm for moving said tone arm in the horizontal direction with respect to said record disc, a first motor drive circuit for energizing said first motor means so as to move said tone arm between an inoperative up-position and a reproducing position on said record disc, a second motor drive circuit for energizing said second motor means in such a manner that said tone arm is moved between an inoperative rest position and said up-position above said reproducing position on said record disc, brake circuit means for supplying a current to said second motor means so as to brake the latter while said second motor means is energized by said second motor drive circuit, detecting means for detecting the speed of horizontal movement of said tone arm, and circuit means supplied with the output of said detecting means for supplying a predetermined output to said second motor drive circuit while said tone arm is moved at a predetermined speed, said tone arm being braked through said second motor drive circuit by the last-mentioned circuit means when said tone arm is moved at a speed higher than said predetermined speed.

17. A tone arm assembly comprising a tone arm having a stylus at one end thereof, mounting means mounting the tone arm for vertical and horizontal movements in respect to a turntable, first motor means mechanically coupled to said tone arm for moving said tone arm in the vertical direction with respect to a record disc on the turntable, second motor means mechanically coupled to said tone arm for moving said tone arm in the horizontal direction with respect to said record disc, a first motor drive circuit for energizing said first motor means so as to move said tone arm between an inoperative up-position and a reproducing position on said record dics, a second motor drive circuit for energizing said second motor means in such a manner that said tone arm is moved between an inoperative rest position and said up-position above said reproducing position on said record disc, signal generating means mechanically coupled to said tone arm for generating a control signal in response to the horizontal movement of said tone arm, a speed control circuit connected between said signal generating means and said second motor drive circuit, said speed control circuit supplying a drive signal to said second motor drive circuit when a predetermined amount of said control signal is supplied to said speed control circuit, detecting means for detecting when said tone arm has been positioned above the record disc, a system control circuit supplied with an output from said detecting means and with said control signal, means for shutting off said second motor drive circuit in response to an output of said system control circuit, and means for energizing said first motor drive circuit after said tone arm has been positioned above the record disc.

18. A tone arm assembly according to claim 17; in which said speed control circuit includes means for generating first and second output signals with respectively different levels, said second motor drive circuit includes first and second transistors connected in series with each other and being controlled with said first and second output signals, respectively, and said said second motor means includes a coil connected to the connecting point of said first and second transistors.

* * * * *